(12) United States Patent
Yokosawa

(10) Patent No.: US 9,488,363 B2
(45) Date of Patent: Nov. 8, 2016

(54) ILLUMINATION APPARATUS, DRIVING APPARATUS AND DRIVING METHOD

(71) Applicant: SONY CORPORATION, Tokyo (JP)

(72) Inventor: Nobuyuki Yokosawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 405 days.

(21) Appl. No.: 13/673,446

(22) Filed: Nov. 9, 2012

(65) Prior Publication Data
US 2013/0135870 A1    May 30, 2013

(30) Foreign Application Priority Data
Nov. 24, 2011    (JP) ................................. 2011-256434

(51) Int. Cl.
| | |
|---|---|
| *F21V 21/30* | (2006.01) |
| *F21V 33/00* | (2006.01) |
| *F21S 6/00* | (2006.01) |
| *F21S 8/06* | (2006.01) |
| *F21S 9/04* | (2006.01) |
| *F21S 8/04* | (2006.01) |
| *F16B 1/00* | (2006.01) |
| *F21V 21/16* | (2006.01) |

(Continued)

(52) U.S. Cl.
CPC ................ *F21V 33/00* (2013.01); *F21S 6/008* (2013.01); *F21S 8/046* (2013.01); *F21S 8/06* (2013.01); *F21S 9/04* (2013.01); *F16B 1/0014* (2013.01); *F21V 14/02* (2013.01); *F21V 21/16* (2013.01); *F21Y 2105/001* (2013.01)

(58) Field of Classification Search
CPC ........ F21S 48/1778; F21S 10/06; F21S 9/04; F21S 6/008; F21S 48/1742; F21S 10/066; F21S 8/046; F21S 8/065; F21S 10/063; F21S 8/06; F21V 33/00; F21V 1/10; F21V 1/12; F21V 14/02; F21V 14/08; F21V 14/085; F21V 21/14; F21V 21/26; F21V 14/025; F21V 14/04; F21V 14/041; F21V 14/045; F21V 7/0016; F21V 17/02; F21V 21/116; F21V 21/30; F21V 21/22; F16B 1/0014
USPC ............ 362/35, 253, 217.03, 279, 290, 325, 362/354, 269, 274, 271, 178, 239, 238, 362/249.03, 249.07; 49/1; 310/306, 307, 310/156.27, 68 R, 69, 73, 79, 114, 343, 64
See application file for complete search history.

(56) References Cited

U.S. PATENT DOCUMENTS

| | | | | |
|---|---|---|---|---|
| 4,503,676 | A | * | 3/1985 | Rutledge .................... F03G 7/06 60/527 |
| 4,513,358 | A | * | 4/1985 | Lemme ......................... 362/276 |
| 5,028,206 | A | * | 7/1991 | Kendregan ............ F04D 25/088 362/96 |
| 5,082,422 | A | * | 1/1992 | Wang .................... F04D 25/088 362/234 |

(Continued)

FOREIGN PATENT DOCUMENTS

| | | |
|---|---|---|
| JP | 2010-061909 | 3/2010 |
| JP | 2010-123539 | 6/2010 |
| JP | 2011-154828 | 8/2011 |

*Primary Examiner* — Renee Chavez
*Assistant Examiner* — James Endo
(74) *Attorney, Agent, or Firm* — Chip Law Group

(57) ABSTRACT

An illumination apparatus disclosed herein includes a first light emitting section, a thermal actuator, and a displacement mechanism. The thermal actuator is configured to generate a driving force on the basis of heat dissipated by the first light emitting section. The displacement mechanism is configured to displace a predetermined object by making use of the driving force generated by the thermal actuator.

16 Claims, 16 Drawing Sheets

(51) Int. Cl.
*F21V 14/02* (2006.01)
*F21Y 105/00* (2016.01)

(56) References Cited

U.S. PATENT DOCUMENTS

| | | | | |
|---|---|---|---|---|
| 5,195,870 A * | 3/1993 | Liu | ........................ | F04D 25/08 362/96 |
| 5,396,769 A * | 3/1995 | Brudnicki | ............... | F03G 7/065 60/527 |
| 5,816,306 A * | 10/1998 | Giacomel | ........................ | 160/6 |
| 6,036,331 A * | 3/2000 | Acquisto | ............... | F04D 25/088 362/234 |
| 7,207,698 B2 * | 4/2007 | Kotovsky et al. | ............ | 362/321 |
| 7,275,846 B2 * | 10/2007 | Browne et al. | ............... | 362/512 |
| 8,790,085 B2 * | 7/2014 | Villella | ................. | F04D 25/08 416/140 |
| 2002/0046622 A1 * | 4/2002 | Yoshida | ................. | F03G 7/065 74/574.4 |
| 2004/0004828 A1 * | 1/2004 | Chernick et al. | ............... | 362/35 |
| 2008/0048519 A1 * | 2/2008 | Stalford | ................. | B81B 3/0024 310/306 |
| 2008/0068838 A1 * | 3/2008 | Galke et al. | .................. | 362/250 |
| 2008/0137359 A1 * | 6/2008 | Strazzanti | ..................... | 362/547 |
| 2008/0178526 A1 * | 7/2008 | Browne et al. | ................. | 49/82.1 |
| 2008/0226449 A1 * | 9/2008 | Villella | ................. | F04D 25/088 416/87 |
| 2010/0007859 A1 * | 1/2010 | Chien et al. | ................ | 353/61 |
| 2010/0135017 A1 * | 6/2010 | Wulfinghoff | .................. | 362/235 |
| 2010/0195336 A1 * | 8/2010 | Hashemi | ................ | F21S 48/115 362/324 |
| 2010/0320932 A1 * | 12/2010 | Ma | ........................ | F21S 10/00 315/294 |
| 2011/0222288 A1 * | 9/2011 | Vissenberg et al. | .......... | 362/253 |
| 2011/0235328 A1 * | 9/2011 | Xu et al. | ..................... | 362/249.02 |

* cited by examiner

ILLUMINATION APPARATUS, DRIVING APPARATUS AND DRIVING METHOD

BACKGROUND

The present technology relates to an illumination apparatus suitable typically for use in rooms, a driving apparatus suitable for driving the illumination apparatus and a driving method adopted by the driving apparatus.

An illumination apparatus used as an indoor lamp has been becoming widely popular. A typical example of such an illumination apparatus is an illumination apparatus hung from a ceiling.

As described in Japanese Patent Laid-open Nos. 2010-123539, 2011-154828 and 2010-61909 (hereinafter referred to as Patent Document 1, Patent Document 2 and Patent Document 3, respectively), some of these illumination apparatus allow, among others, the direction of illumination of light emitted thereby and the position of emission of light emitted thereby to be changed. To put it concretely, as described in Patent Document 1, the orientation of a substrate on which an LED (Light Emitting Diode) serving as a light source is mounted is changed by making use of a driving section such as a motor. That is to say, Patent Document 1 discloses an illumination apparatus allowing, among others, the direction of illumination of light emitted thereby and the position of emission of light emitted thereby to be changed by changing the orientation of such a substrate. Patent Document 2 discloses an illumination apparatus allowing, among others, the direction of illumination of light emitted thereby to be changed by changing the orientation of the reflector. In addition, Patent Document 3 discloses an illumination apparatus allowing, among others, the direction of illumination of light emitted thereby to be changed manually.

SUMMARY

There have been proposed a variety of illumination apparatus each having a movable section for changing the direction of illumination of light emitted by the illumination apparatus or the like as described above. However, the driver of the movable section requires separate power other than power supplied to the light source. A typical example of the driver is a motor. As an alternative, the user manually changes, among others, the direction of illumination of light emitted by the illumination apparatus.

It is thus desirable to provide an illumination apparatus having a movable section moved to change, among others, the direction of illumination of light emitted by a light emitting section employed in the illumination apparatus. Without requiring the user to spend time and make efforts to manually drive the movable section, this illumination apparatus is capable of preventing the power consumption from increasing because there is no need to separately supply power other than that supplied to the light emitting section and capable of preventing the cost from rising by suppressing the number of additional components.

In order to solve the problems described above, in accordance with the present technology, there has been proposed an illumination apparatus having a configuration described as follows. The illumination apparatus according to an embodiment of the present technology includes: a first light emitting section; a thermal actuator configured to generate a driving force on the basis of heat dissipated by the first light emitting section; and a displacement mechanism configured to displace a predetermined object by making use of the driving force generated by the thermal actuator.

In addition, a driving apparatus according to an embodiment of the present technology has a configuration described as follows. The driving apparatus according to an embodiment of the present technology includes: a light emitting section; and a thermal actuator configured to generate a driving force on the basis of heat dissipated by the light emitting section.

On top of that, a driving method according to an embodiment of the present technology includes displacing a predetermined object by making use of a driving force generated by a thermal actuator configured to generate the driving force on the basis of heat dissipated by a light emitting section.

As described above, in accordance with the present technology, the displacement mechanism serving as a movable section is moved by making use of heat dissipated by the light emitting section.

Thus, it is not necessary to separately provide a force generation section such as a motor for generating the driving force and it is therefore possible to effectively prevent the power consumption from rising. At the same time, it is also unnecessary to separately add electric wires, a driving circuit substrate and the like. Accordingly, the number of separately added components can be prevented from increasing so that a cost increase can be suppressed.

In accordance with the present technology, there is provided an illumination apparatus having a movable section moved to change typically, among others, the direction of illumination of light emitted by a light emitting section employed in the illumination apparatus. Without requiring the user to spend time and make efforts to manually drive the movable section, this illumination apparatus is capable of preventing the power consumption from increasing because there is no need to separately supply power other than that supplied to the light emitting section and capable of preventing the cost from rising by suppressing the number of additional components.

DETAILED DESCRIPTION OF THE PREFERRED EMBODIMENT

An embodiment of the present technology is explained below. It is to be noted that the explanation is divided into topics arranged in the following order.
1: External Appearance of the Illumination Apparatus
2: Opening/Closing Operations and Configuration for Implementing Them
3: Circuit Configuration
4: Conclusion
5: Typical Modifications 1: External Appearance of the Illumination Apparatus FIGS. 1 to 6 are six diagrams each showing an external appearance of an illumination apparatus 1 according to an embodiment of the present technology.

Figure 1:
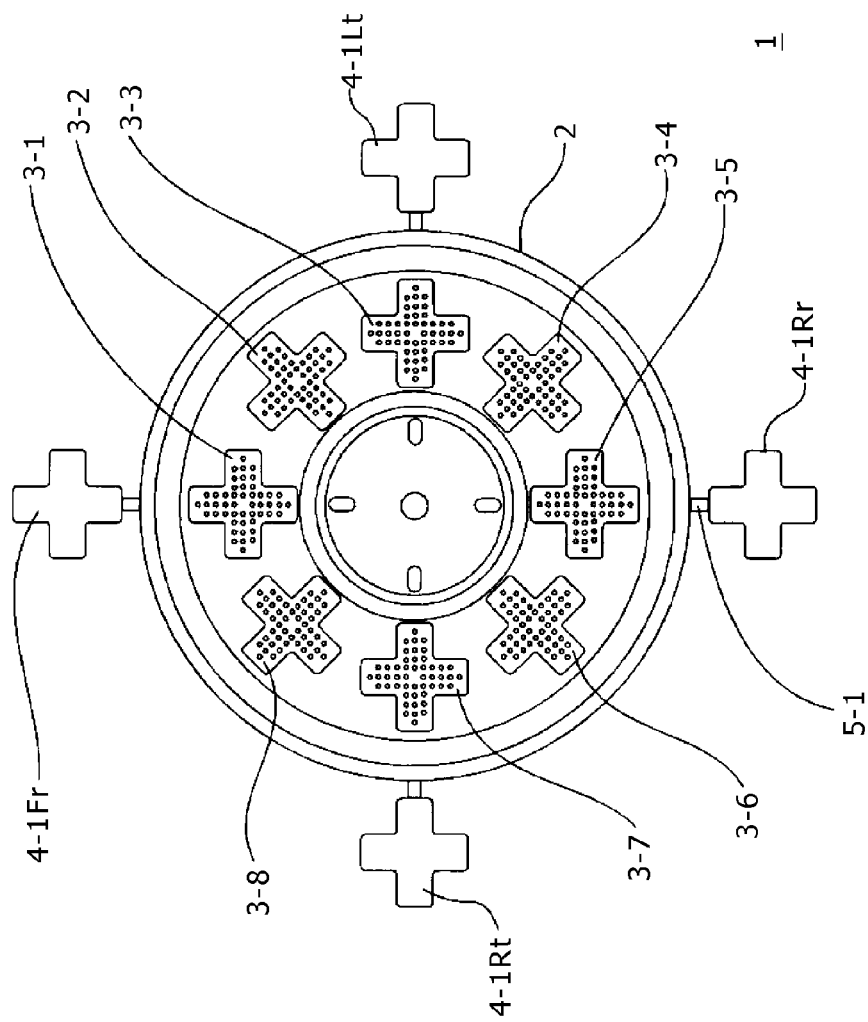
FIG. 1 is a top-view diagram showing an external appearance of an illumination apparatus according to an embodiment.
Figure 2:
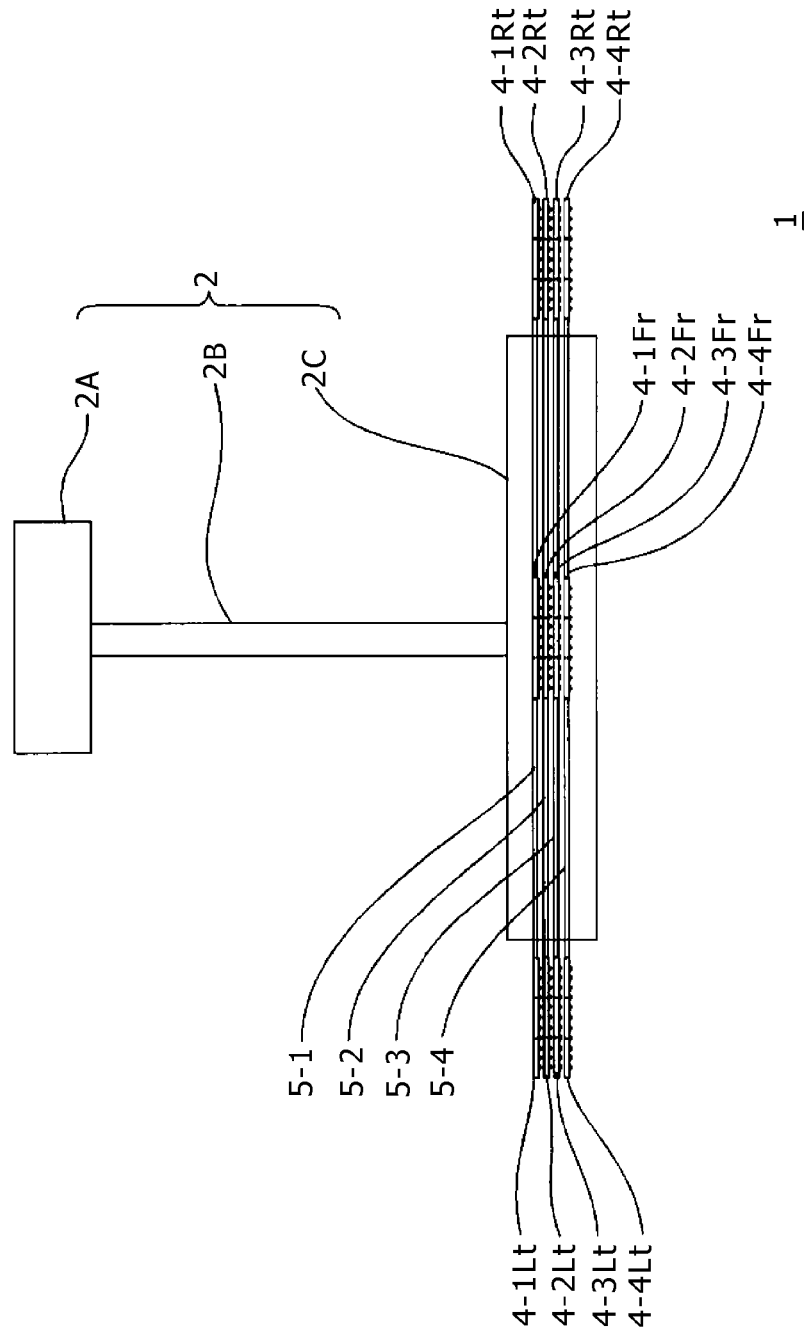
FIG. 2 is a front-view diagram showing the external appearance of the illumination apparatus according to the embodiment.
Figure 3:
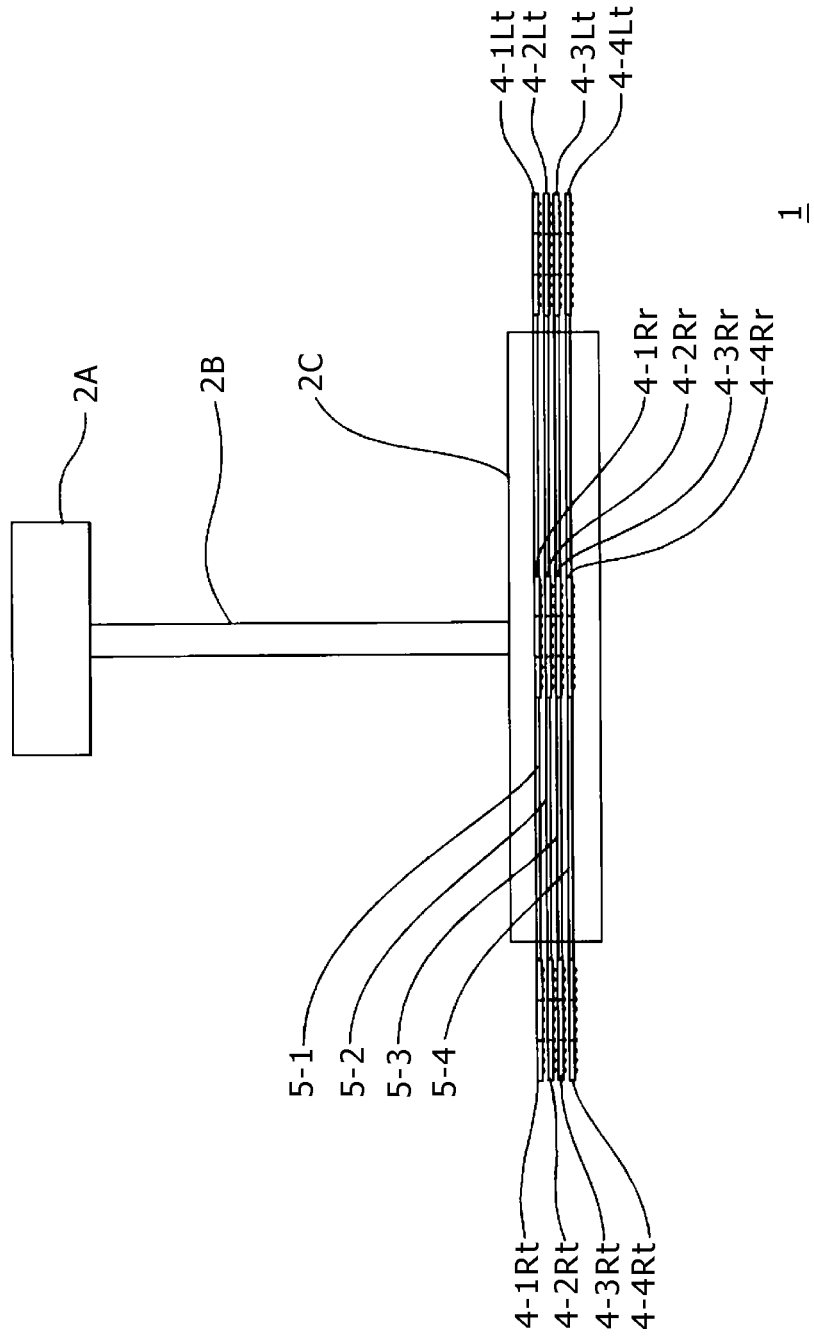
FIG. 3 is a rear-view diagram showing the external appearance of the illumination apparatus according to the embodiment.
Figure 4:
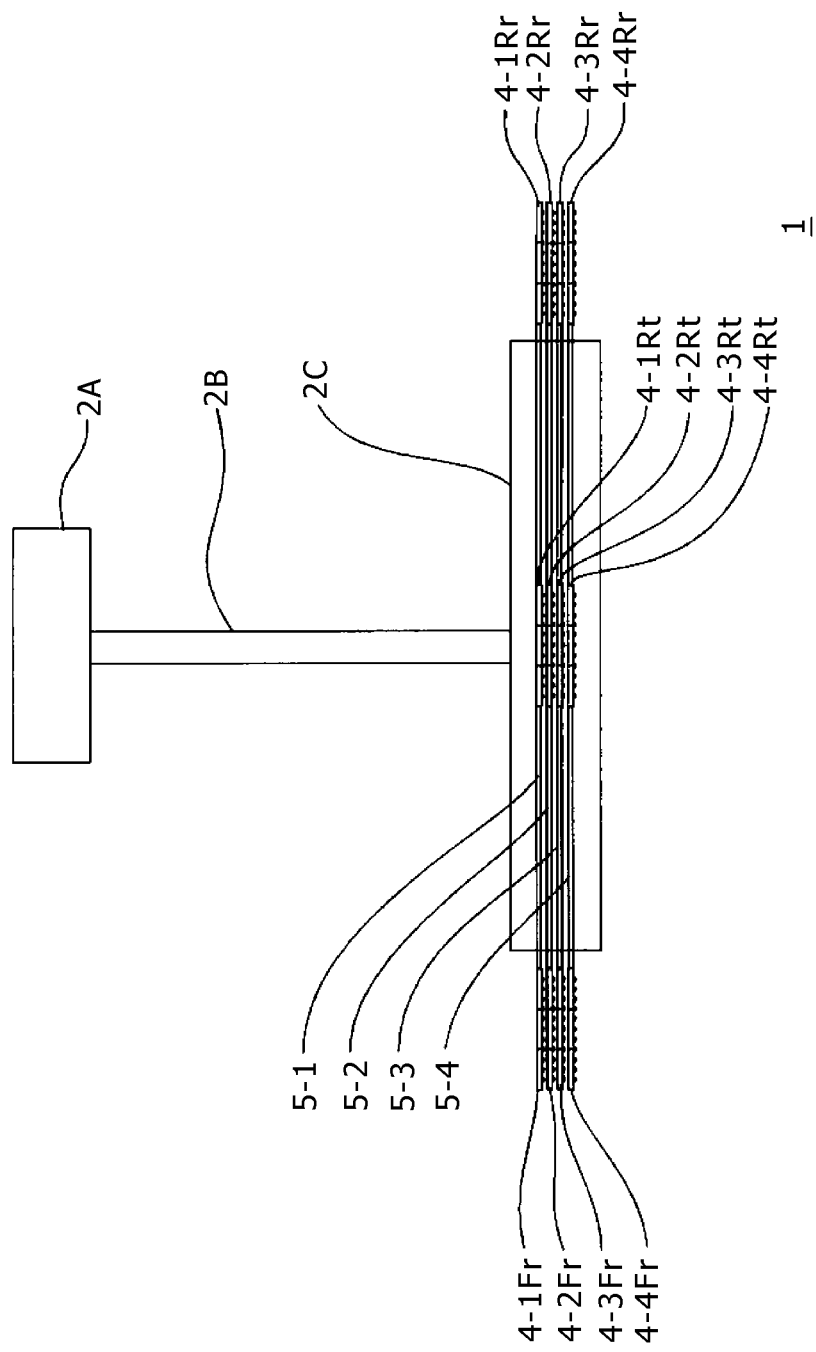
FIG. 4 is a diagram showing the right side of the external appearance of the illumination apparatus according to the embodiment.
Figure 5:
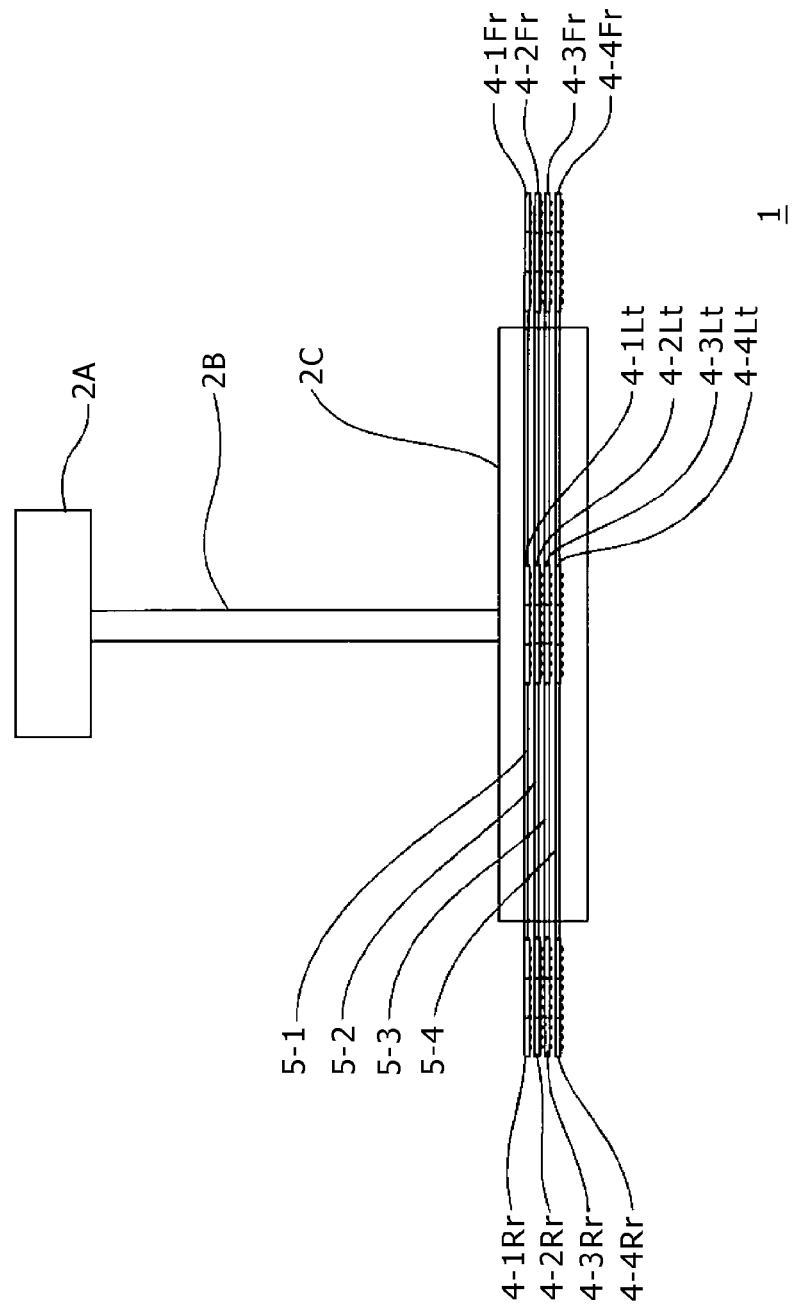
FIG. 5 is a diagram showing the left side of the external appearance of the illumination apparatus according to the embodiment.
Figure 6:
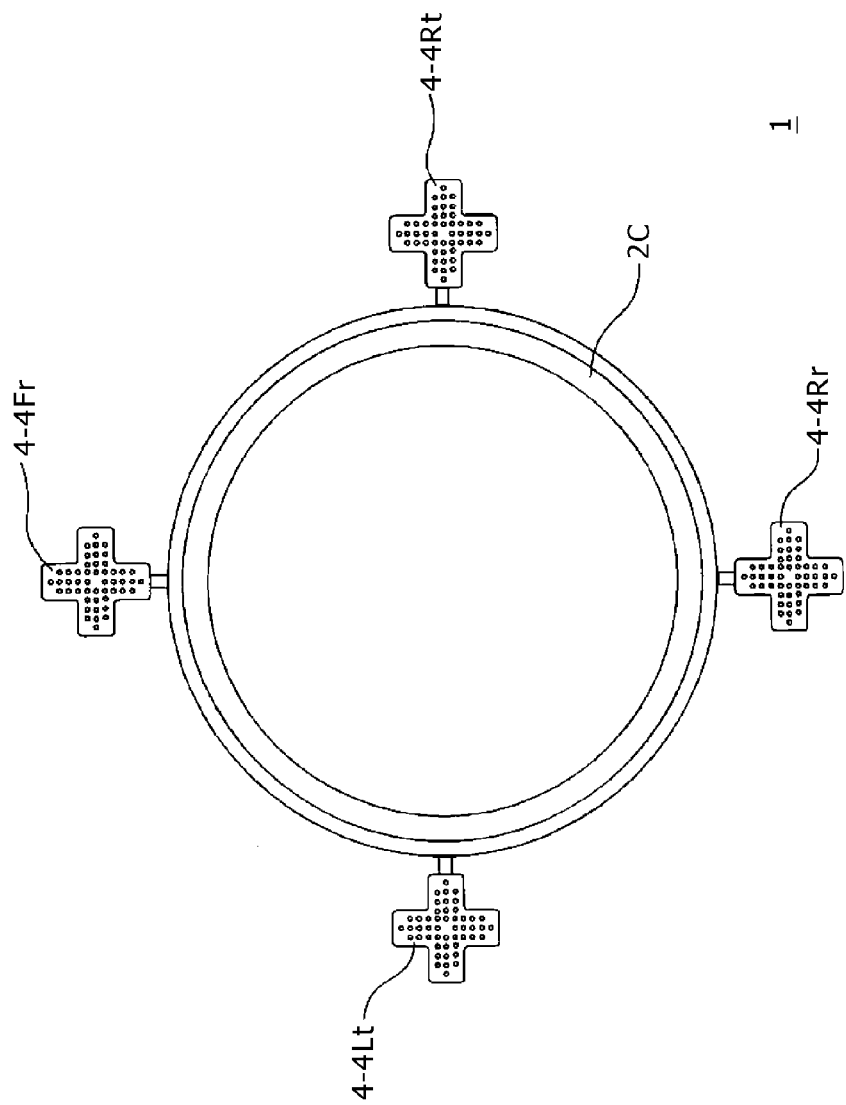
FIG. 6 is a bottom-view diagram showing the external appearance of the illumination apparatus according to the embodiment.

To be more specific, FIG. 1 is a top-view diagram, FIG. 2 is a front-view diagram, FIG. 3 is a rear-view diagram, FIG. 4 is a right-side-view diagram, and FIG. 5 is a left-side-view diagram whereas FIG. 6 is a bottom-view diagram.

First of all, the illumination apparatus 1 according to the embodiment is assumed to be a ceiling-type illumination apparatus which is defined as an illumination apparatus used by hanging the apparatus from typically the ceiling of a room.

From FIGS. 1 to 6, it is obvious that the illumination apparatus 1 is configured to include a main section 2, a plurality of upward facing LED (Light Emitting Diode) substrates 3, a plurality of cross-shaped holding sections 5 and a plurality of downward facing LED substrates 4 each provided on one of the edges of the cross shapes of these cross-shaped holding sections 5.

On the surface of each of the upward facing LED substrates 3, a plurality of LEDs each shown as a white circle in the figures are created. The upward facing LED substrates 3 are provided on the upper surface of the main section 2. The upper surface is the surface which is exposed to the ceiling when the illumination apparatus 1 is in use. Thus, the surfaces of the upward facing LED substrates 3 are exposed to the ceiling. When the LED created on the upward facing LED substrate 3 is turned on, light emitted by the LED is radiated to the ceiling. In this case, the illumination apparatus 1 carries out a function referred to as indirect illumination.

In the above configuration, the upward facing LED substrates 3 function as an indirect illumination section. As shown in the figures, the number of aforementioned upward facing LED substrates 3 provided in the illumination apparatus 1 is eight. To put it concretely, the upward facing LED substrates 3-1, 3-3, 3-5 and 3-7 are provided on respectively the front, left, rear and right sides of the illumination apparatus 1. In addition, the upward facing LED substrate 3-2 is provided on the left-inclining front side which is a side between the front and left sides of the illumination apparatus 1. In the same way, the upward facing LED substrate 3-4 is provided on the left-inclining rear side which is a side between the left and rear sides of the illumination apparatus 1. Likewise, the upward facing LED substrate 3-6 is provided on the right-inclining rear side which is a side between the rear and right sides of the illumination apparatus 1. Similarly, the upward facing LED substrate 3-8 is provided on the right-inclining front side which is a side between the right and front sides of the illumination apparatus 1.

From FIGS. 2 to 5, it is obvious that the number of cross-shaped holding sections 5 is four. The four cross-shaped holding sections 5 are provided in a space between an upper side and a lower side. To put it concretely, the cross-shaped holding sections 5-1, 5-2, 5-3 and 5-4 are provided sequentially at locations starting with that on the upper side in the same order as the order in which the cross-shaped holding sections 5-1, 5-2, 5-3 and 5-4 are enumerated in this sentence.

On each edge of a cross-shaped holding section 5, a downward facing LED substrate 4 is provided.

In the same way as the upward facing LED substrate 3 described earlier, on the surface of each of the downward facing LED substrates 4, a plurality of LEDs each shown as a white circle in the figures are created. The cross-shaped holding section 5 holds the downward facing LED substrate 4 in such a way that the surface of the downward facing LED substrate 4 is exposed to the lower side. Thus, when the LED created on the downward facing LED substrate 4 is turned on at the time at which the illumination apparatus 1 is used, light emitted by the LED is radiated directly to the inside of the room in order to illuminate the inside of the room. At that time, the illumination apparatus 1 carries out a function referred to as direct illumination.

In the above configuration, the downward facing LED substrates 4 are provided on the edges of the four cross-shaped holding sections 5. Thus, the number of aforementioned downward facing LED substrates 4 created in the illumination apparatus 1 is 16.

In this configuration, the first-stage cross-shaped holding section 5-1 is provided on the uppermost stage whereas the four downward facing LED substrates 4 provided on the edges of the first-stage cross-shaped holding section 5-1 are each denoted by reference numeral 4-1. In this configuration, the four downward facing LED substrates 4-1 are a downward facing LED substrate 4-1Fr provided on the front side, a downward facing LED substrate 4-1Rr provided on the rear side, a downward facing LED substrate 4-1Rt provided on the right side and a downward facing LED substrate 4-1Lt provided on the left side.

By the same token, the second-stage cross-shaped holding section 5-2 is provided on a stage right below the uppermost stage whereas the four downward facing LED substrates 4 provided on the edges of the second-stage cross-shaped holding section 5-2 are each denoted by reference numeral

4-2. In this configuration, the four downward facing LED substrates 4-2 are a downward facing LED substrate 4-2Fr provided on the front side, a downward facing LED substrate 4-2Rr provided on the rear side, a downward facing LED substrate 4-2Rt provided on the right side and a downward facing LED substrate 4-2Lt provided on the left side.

In the same way, the third-stage cross-shaped holding section 5-3 is provided on a stage right above the lowermost stage whereas the four downward facing LED substrates 4 provided on the edges of the third-stage cross-shaped holding section 5-3 are each denoted by reference numeral 4-3. In this configuration, the four downward facing LED substrates 4-3 are a downward facing LED substrate 4-3Fr provided on the front side, a downward facing LED substrate 4-3Rr provided on the rear side, a downward facing LED substrate 4-3Rt provided on the right side and a downward facing LED substrate 4-3Lt provided on the left side.

Likewise, the fourth-stage cross-shaped holding section 5-4 is provided on the lowermost stage whereas the four downward facing LED substrates 4 provided on the edges of the fourth-stage cross-shaped holding section 5-4 are each denoted by reference numeral 4-4. In this configuration, the four downward facing LED substrates 4-4 are a downward facing LED substrate 4-4Fr provided on the front side, a downward facing LED substrate 4-4Rr provided on the rear side, a downward facing LED substrate 4-4Rt provided on the right side and a downward facing LED substrate 4-4Lt provided on the left side.

From FIGS. 2 to 5, it is obvious that the main section 2 is configured to include a mounting section 2A, a case 2C and a sling section 2B. The mounting section 2A is a section hung from a hanger such as a ceiling whereas the case 2C is a case for covering the upper and lower sides of the center of the cross-shaped holding section 5. That is to say, the case 2C does not cover the downward facing LED substrates 4 provided on the edges of the cross-shaped holding section 5. On the other hand, the sling section 2B is a section for linking the mounting section 2A and the case 2C to each other.

2: Opening/Closing Operations and Configuration for Implementing them

FIGS. 1 to 6 each show an initial state of the illumination apparatus 1 according to the embodiment. The initial state is also referred to as a turned-off state. When the LEDs are turned on, the illumination apparatus 1 according to the embodiment makes a transition from the initial state to an expanded state which is a state of being expanded as shown in FIG. 7 showing a bottom view of the illumination apparatus 1.

To put it concretely, in the initial state shown in FIGS. 1 to 6, the downward facing LED substrates 4 created at all stages on the front, rear, right and left sides overlap each other at positions on the front, rear, right and left sides. In the expanded state, however, the cross-shaped holding sections 5 are rotated in an on-surface direction so that the overlapping state of the downward facing LED substrates 4 is ended. Thus, the downward facing LED substrates 4 are expanded to their respective positions which are different from each other.

Figure 7:
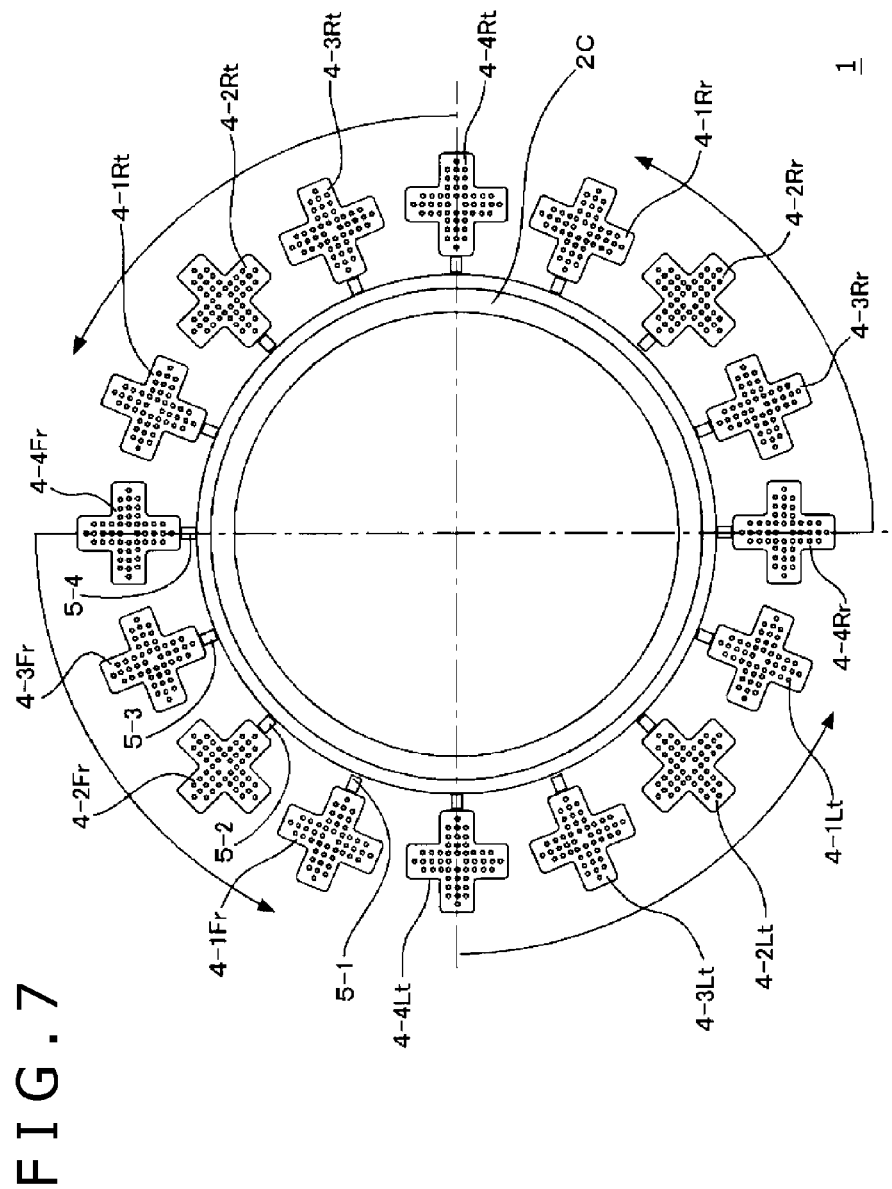
FIG. 7 is a bottom-view diagram showing the external appearance of the illumination apparatus according to the embodiment in a state of being expanded.

To put it concretely, in this embodiment, the position of the fourth-stage cross-shaped holding section 5-4 provided on the lowermost stage is fixed whereas the cross-shaped holding sections 5-1, 5-2 and 5-3 other than the fourth-stage cross-shaped holding section 5-4 are rotated, resulting in the expanded state shown in FIG. 7.

At that time, the quantity of a rotation made by the first-stage cross-shaped holding section 5-1 provided on the uppermost stage is largest whereas the quantity of a rotation made by the second-stage cross-shaped holding section 5-2 provided on a stage right below the uppermost stage is second to the largest rotation quantity. On the other hand, the quantity of a rotation made by the third-stage cross-shaped holding section 5-3 provided on a stage right above the lowermost stage is smallest. In addition, when viewed from the bottom side, the rotation direction is the counterclockwise direction.

Thus, in the expanded state of this embodiment, the downward facing LED substrate 4-4Fr provided on the front side is taken as a reference. With the downward facing LED substrate 4-4Fr taken as a reference, in the counterclockwise direction, the downward facing LED substrates 4 are laid out sequentially in the following order: 4-4Fr→4-3Fr→4-2Fr→4-1Fr→4-4Lt→4-3Lt→4-2Lt→4-1Lt→4-4Rr→4-3Rr→4-2Rr→4-1Rr→4-4Rt→4-3Rt→4-2Rt→4-1Rt→4-4Fr.

Next, the configuration of the cross-shaped holding section 5 is explained by referring to FIG. 8 as follows.

Figure 8:
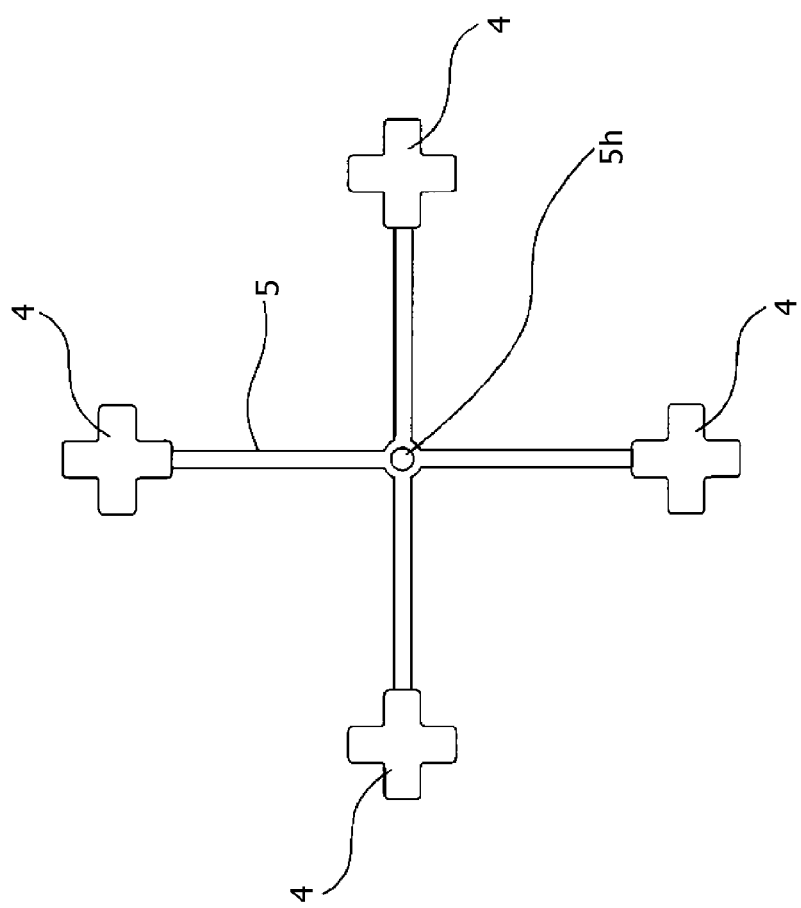
FIG. 8 is a diagram showing the configuration of a cross-shaped holding section employed in the illumination apparatus according to the embodiment.

As shown in FIG. 8, the cross-shaped holding section 5 has an external shape resembling approximately a cross shape. On each edge of the cross shape, a downward facing LED substrate 4 is created.

In addition, at the center of the cross-shaped holding section 5, a hole 5h is provided as shown in the figure. The cross-shaped holding section 5 allows a rotation shaft 6 which will be described later to be inserted into the hole 5h. With the rotation shaft 6 inserted into the hole 5h, the cross-shaped holding section 5 can be rotated in an on-surface direction around the rotation shaft 6.

Then, in order to make an automatic transition from the initial state described above to the expanded state, in place of a manual transition which would be otherwise initiated by the user, there is provided a force generation section configured to provide the illumination apparatus 1 with a driving force for rotating the cross-shaped holding section 5.

A good example of the force generation section is a motor described in Patent Document 1.

If it is necessary to provide the force generation section such as a motor which requires additional electric power, however, the additional electric power must be supplied to the force generation section besides the electric power supplied to the light source. Accordingly, the power consumption is increased by a quantity corresponding to the additional electric power. In addition, it is necessary to separately provide additional components such as electric wires and a driving circuit substrate. Thus, the cost also rises as well.

The embodiment addressing the problems described above includes the force generation section configured to implement the expansion operations like the ones described above by making use of heat dissipated by the light source.

Figure 9:
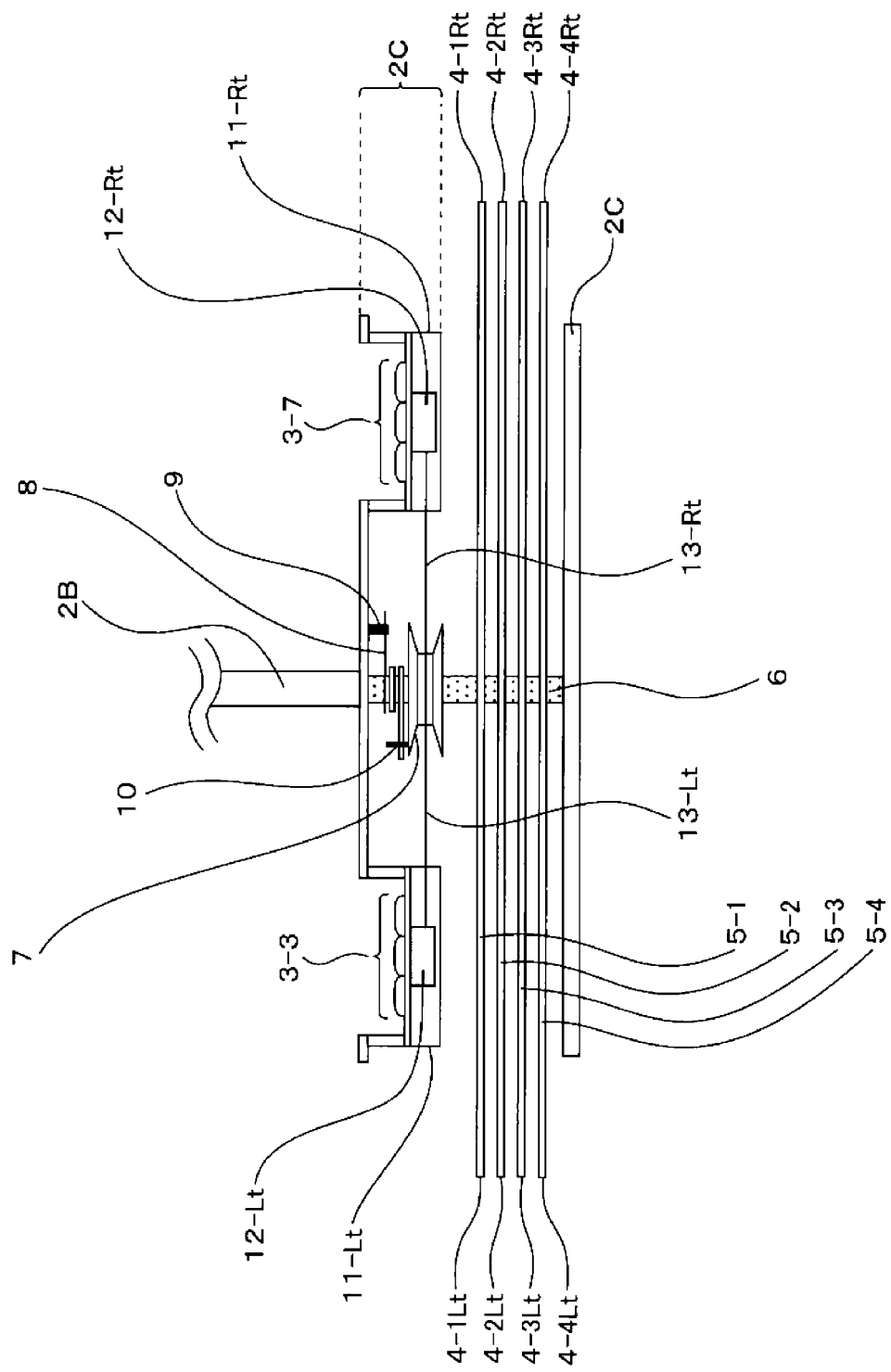
FIG. 9 is a cross-sectional diagram showing the configuration of mainly a movable section employed in the illumination apparatus according to the embodiment.
Figure 10:
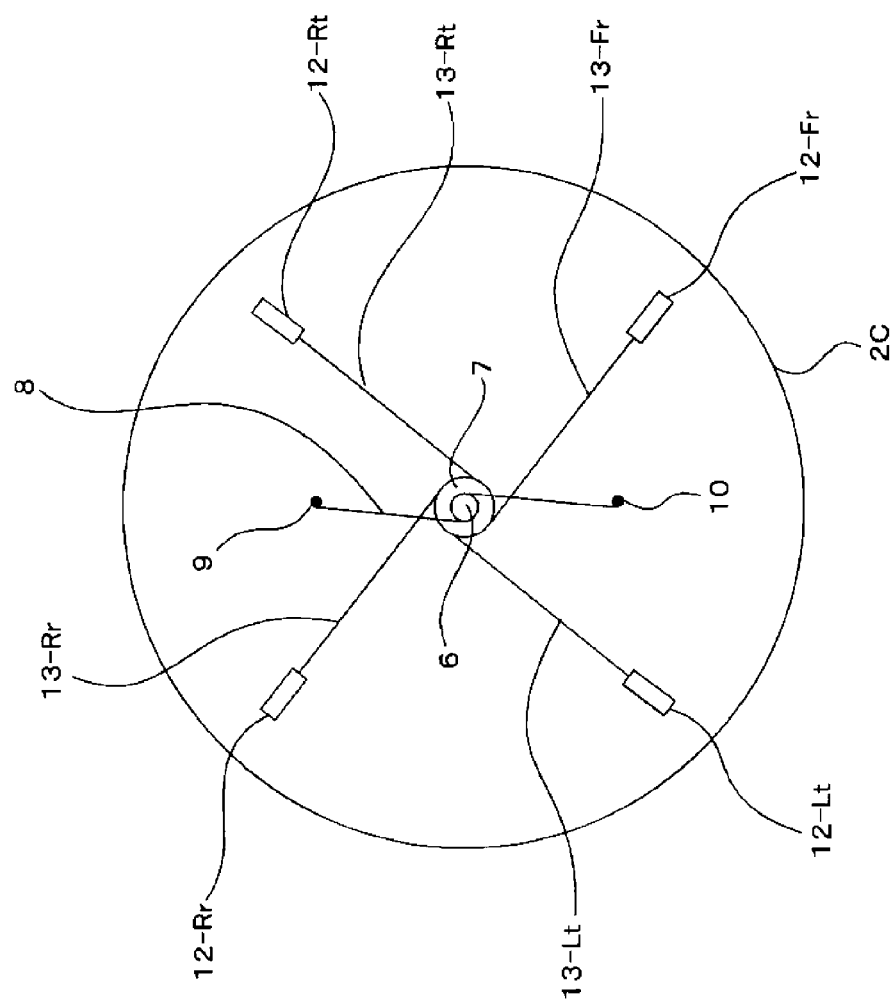
FIG. 10 is a top-view diagram showing the configuration of mainly the movable section employed in the illumination apparatus according to the embodiment.

FIG. 9 is a cross-sectional diagram showing the configuration of mainly a movable section employed in the illumination apparatus 1 according to the embodiment whereas FIG. 10 is a top-view diagram showing the configuration of mainly the movable section employed in the illumination apparatus according to the embodiment.

It is to be noted that the cross-sectional diagram of FIG. 9 is a cross-sectional diagram showing a right-to-left direction cross section of the illumination apparatus 1. However, a cross-sectional diagram showing a front-to-rear direction cross section of the illumination apparatus 1 would be identical with the cross-sectional diagram showing the right-to-left direction cross section of the illumination apparatus 1. Thus, the cross-sectional diagram showing the front-to-rear direction cross section of the illumination apparatus 1 is not given.

First of all, the illumination apparatus 1 is provided with the rotation shaft 6. The rotation shaft 6 is provided at the center of the illumination apparatus 1 and oriented in the vertical direction. The rotation shaft 6 is inserted into the hole 5h of each cross-shaped holding section 5.

At that time, the rotation shaft 6 is inserted into the hole 5h of the first-stage cross-shaped holding section 5-1 provided on the uppermost stage. Without regard to the rotation of the rotation shaft 6, however, the orientation of the first-stage cross-shaped holding section 5-1 is fixed typically by firmly attaching the upper side of the first-stage cross-shaped holding section 5-1 to the case 2C.

In the case of this embodiment, a driving force accompanying the rotation of the rotation shaft 6 is applied to only the fourth-stage cross-shaped holding section 5-4 provided on the lowermost stage. That is to say, only the fourth-stage cross-shaped holding section 5-4 is rotated to accompany the rotation of the rotation shaft 6.

The second-stage cross-shaped holding section 5-2 provided on a stage right beneath the uppermost stage and the third-stage cross-shaped holding section 5-3 provided on a stage right above the lowermost stage are rotated to accompany a rotation made by the fourth-stage cross-shaped holding section 5-4 at the lowermost stage in accordance with the rotation made by the rotation shaft 6. A detailed configuration will be described later.

A torsion coil spring 8 shown in the figure applies a pressure to the rotation shaft 6 provided in this configuration. To put it concretely, in the case of this embodiment, the torsion coil spring 8 applies the pressure to the rotation shaft 6 in a rotation direction opposite to an expansion direction shown earlier in FIG. 7. When viewed from the bottom side, the expansion direction is the counterclockwise direction. In this way, in accordance with an operation carried out to turn off the illumination apparatus 1, it is possible to restore the expanded state shown in FIG. 7 as a state corresponding to the turned-on state back to the initial state shown in FIGS. 1 to 6.

It is to be noted that the two ends of the torsion coil spring 8 are fixed to the case 2C by making use of pins 9 and 10 respectively.

In addition, a pulley 7 is mounted on the rotation shaft 6. The pulley 7 has a hole not shown in the figure at the center. The rotation shaft 6 is inserted into this hole. That is to say, the hole is capable of accommodating the rotation shaft 6 inserted into the hole.

The rotation shaft 6 is rotated to accompany a rotation made by the pulley 7.

The illumination apparatus 1 according to this embodiment is provided with thermal actuators 12 serving as force generation section for rotating the pulley 7.

To put it concretely, the thermal actuators 12 in this embodiment are four thermal actuators 12-Rt, 12-Lt, 12-Fr and 12-Rr. The thermal actuator 12-Rt is provided on the right side of the illumination apparatus 1 whereas the thermal actuator 12-Lt is provided on the left side of the illumination apparatus 1. On the other hand, the thermal actuator 12-Fr is provided on the front side of the illumination apparatus 1 whereas the thermal actuator 12-Rr is provided on the rear side of the illumination apparatus 1.

From FIG. 9, it is obvious that the thermal actuator 12-Rt on the right side of the illumination apparatus 1 is provided at a position serving as the rear side of the upward facing LED substrate 3-7 on the case 2C on the upper side. By the same token, it is obvious that the thermal actuator 12-Lt on the left side of the illumination apparatus 1 is provided at a position serving as the rear side of the upward facing LED substrate 3-3 on the case 2C on the upper side.

In addition, as shown in none of the figures including FIG. 9, the thermal actuator 12-Fr on the front side of the illumination apparatus 1 is provided at a position serving as the rear side of the upward facing LED substrate 3-1 on the case 2C on the upper side. By the same token, the thermal actuator 12-Rr on the rear side of the illumination apparatus 1 is provided at a position serving as the rear side of the upward facing LED substrate 3-5 on the case 2C on the upper side.

In this case, at a position serving as the rear side of the upward facing LED substrate 3-7, there is created a heat collecting case 11-Rt for collecting heat dissipated in a turned-on period on the rear side of the upward facing LED substrate 3-7 and the thermal actuator 12-Rt provided on the right side is accommodated in the heat collecting case 11-Rt.

By the same token, at a position serving as the rear side of the upward facing LED substrate 3-3, there is created a heat collecting case 11-Lt for collecting heat dissipated in a turned-on period on the rear side of the upward facing LED substrate 3-3 and the thermal actuator 12-Lt provided on the left side is accommodated in the heat collecting case 11-Lt.

In addition, as shown in none of the figures, at a position serving as the rear side of the upward facing LED substrate 3-1, there is created a heat collecting case 11-Fr for collecting heat dissipated in a turned-on period on the rear side of the upward facing LED substrate 3-1 and the thermal actuator 12-Fr provided on the front side is accommodated in the heat collecting case 11-Fr.

By the same token, at a position serving as the rear side of the upward facing LED substrate 3-5, there is created a heat collecting case 11-Rr for collecting heat dissipated in a turned-on period on the rear side of the upward facing LED substrate 3-5 and the thermal actuator 12-Rr provided on the rear side is accommodated in the heat collecting case 11-Rr.

The thermal actuator 12 is an actuator for generating a driving force in accordance with heat.

Such a thermal actuator 12 is configured to pull a wire 13 wound around the pulley 7 in accordance with heat generated by the upward facing LED substrates 3 provided for the thermal actuator 12. To put it concretely, as shown in FIG. 10, the wires 13 wound around the pulley 7 are a wire 13-Rt connected to the thermal actuator 12-Rt, a wire 13-Lt connected to the thermal actuator 12-Lt, a wire 13-Fr connected to the thermal actuator 12-Fr and a wire 13-Rr connected to the thermal actuator 12-Rr. When the thermal actuators 12 pull the wires 13 in accordance with heat, the pulley 7 is rotated in the expansion direction explained earlier. That is to say, the rotation shaft 6 can be rotated in the expansion direction, resisting the pressure applied by the torsion coil spring 8 to the rotation shaft 6.

Figure 11:
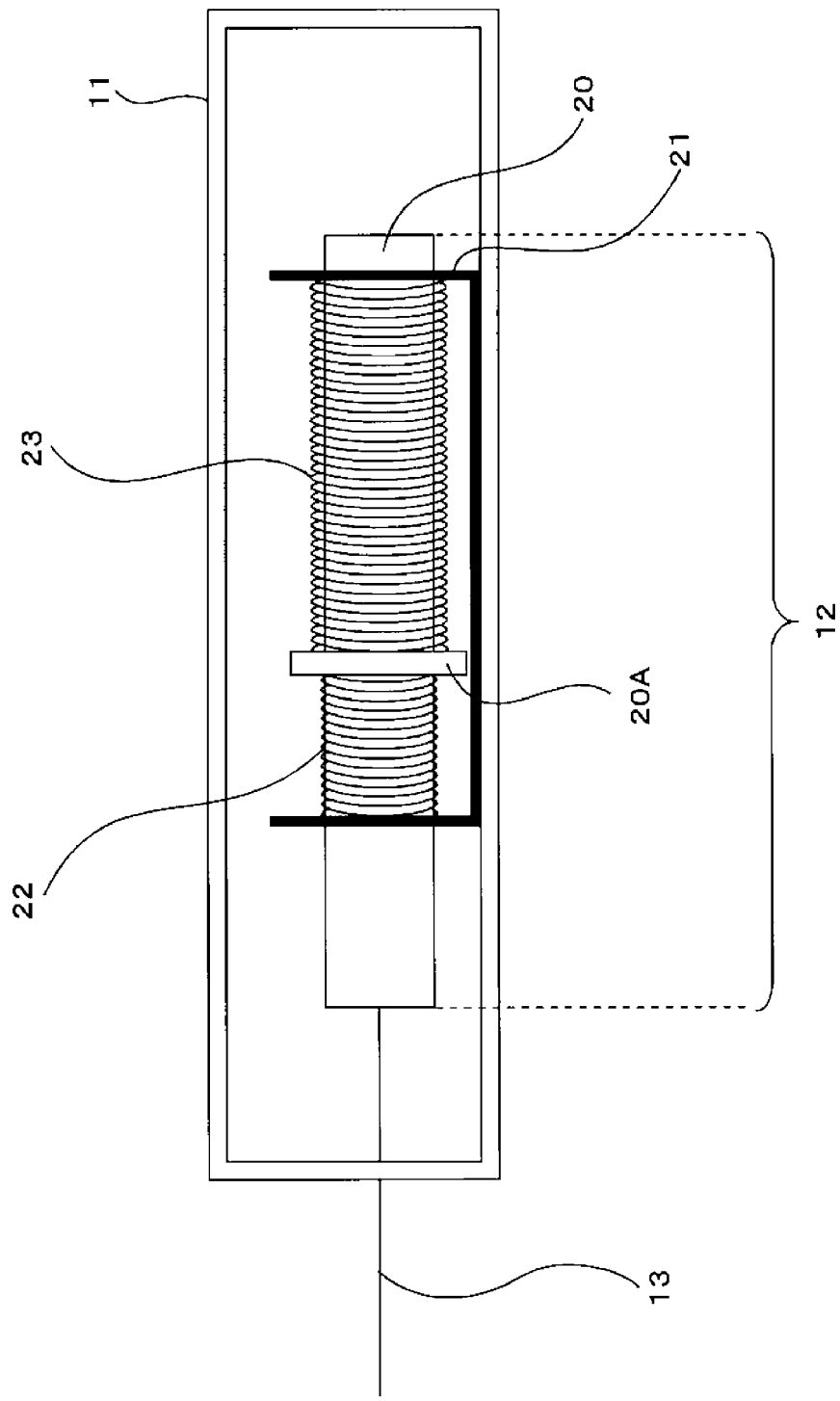
FIG. 11 is an explanatory diagram showing a typical concrete configuration of a thermal actuator.

FIG. 11 is an explanatory diagram showing a typical concrete configuration of the thermal actuator 12. FIG. 11 shows the cross-sectional structure of the heat collecting case 11 and the thermal actuator 12 provided in the heat collecting case 11.

The thermal actuator 12 employed in this embodiment makes use of a shape-memory alloy spring 22.

To put it concretely, the thermal actuator 12 is configured to include a piston 20, a piston support section 21, the shape-memory alloy spring 22 and a coil spring 23.

The external shape of the piston 20 is approximately cylindrical. As shown in the figure, a specific end of the piston 20 is connected to the wire 13. In addition, at about the center of the piston 20, the front and rear surfaces of a specific end of the shape-memory alloy spring 22 and a specific end of the coil spring 23 are brought into contact with each other to form a collision avoidance section 20A.

The piston support section 21 has two walls and a bottom. Each of the walls is oriented in the vertical direction on the diagram page. Each of the walls has a hole through which the piston 20 is inserted. The bottom is linked to the walls and oriented in a direction perpendicular to the walls.

An end of the piston 20 is inserted into the hole created on a specific one of the two walls of the piston support section 21. This end of the piston 20 is connected to the wire 13. In the following description, the specific wall of the piston support section 21 is referred to as a front-side wall. On the other hand, the other end of the piston 20 is inserted into the hole created on the other one of the two walls of the piston support section 21. This other end of the piston 20 is not connected to the wire 13. In the following description, the other wall of the piston support section 21 is referred to as an inner-side wall.

In such a thermal actuator 12, the ends of the piston 20 are inserted into the holes created on the two walls of the piston support section 21 as described above. As shown in the figure, the shape-memory alloy spring 22 is wound around a portion between the front-side wall and the collision avoidance section 20A on the piston 20 whereas the coil spring 23 is wound around a portion between the inner-side wall and the collision avoidance section 20A on the piston 20.

In this embodiment, the shape-memory alloy spring 22 is made of typically an Ni—Ti alloy. In a state in which a pressure generated by the coil spring 23 is applied as is the case with this configuration, the shape-memory alloy spring 22 is expanded gradually in accordance with temperature increases.

Thus, when heat is transferred from the upward facing LED substrate 3, the piston 20 moves to a side opposite to the side on which the wire 13 is connected. That is to say, when the LEDs provided on the upward facing LED substrate 3 are turned on, a driving force is generated in a direction in which the wire 13 is pulled.

It is to be noted that the material which the shape-memory alloy spring 22 is made of is by no means limited to the Ni—Ti alloy. For example, the shape-memory alloy spring 22 can also be made of another shape-memory alloy such as an Fe—Mn—Si alloy.

The thermal actuator 12 like the one described above is capable of changing the illumination apparatus 1 from the initial state shown in FIGS. 1 to 6 to the expanded state shown in FIG. 7 by making use of heat dissipated by the upward facing LED substrate 3.

In this case, when the LEDs created on the upward facing LED substrate 3 are turned off, that is, when the illumination apparatus 1 makes a transition to a turned-off state, the amount of heat dissipated by the upward facing LED substrate 3 gradually decreases so that the pressure applied by the torsion coil spring 8 rotates the rotation shaft 6 in the opposite direction. Thus, a gradual transition from the expanded state to the initial state is made.

At that time, in the illumination apparatus 1, as described before, the fourth-stage cross-shaped holding section 5-4 provided on the lowermost stage is fixed and only the first-stage cross-shaped holding section 5-1 provided on the uppermost stage is rotated in accordance with a rotation made by the rotation shaft 6. Thus, the second-stage cross-shaped holding section 5-2 provided on a stage right beneath the uppermost stage and the third-stage cross-shaped holding section 5-3 provided on a stage right above the lowermost stage are rotated to implement the expanded state shown in FIG. 7.

In addition, when the LEDs are turned off in order to return to the initial state, as shown in FIGS. 1 to 6, the downward facing LED substrates 4 created on the front, rear, right and left sides at each stage are put in a state of overlapping each other at positions on the front, rear, right and left sides.

Figure 12:
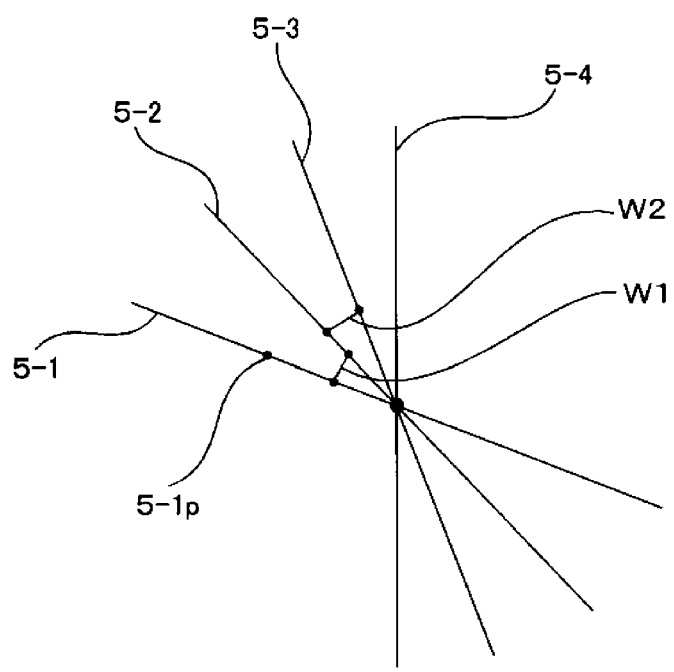
FIG. 12 is an explanatory diagram showing a concrete configuration for implementing opening and closing operations of the embodiment.

Next, by referring to FIG. 12, the following description explains a concrete configuration for implementing opening and closing operations in accordance with the embodiment.

As shown in FIG. 12, the illumination apparatus 1 according to the embodiment is provided with a first wire W1 for connecting the first-stage cross-shaped holding section 5-1 provided on the uppermost stage to the second-stage cross-shaped holding section 5-2 provided on a stage right beneath the uppermost stage and a second wire W2 for connecting the second-stage cross-shaped holding section 5-2 provided on a stage right beneath the uppermost stage to the third-stage cross-shaped holding section 5-3 provided on a stage right above the lowermost stage.

By properly setting the lengths of the first wire W1 and the second wire W2, it is possible to set the expanded-state locations of the second-stage cross-shaped holding section 5-2 provided on a stage right beneath the uppermost stage and the third-stage cross-shaped holding section 5-3 provided on a stage right above the lowermost stage at positions determined in advance. The expanded-state locations of the second-stage cross-shaped holding section 5-2 and the third-stage cross-shaped holding section 5-3 are rotation angles to which the second-stage cross-shaped holding section 5-2 and the third-stage cross-shaped holding section 5-3 are respectively rotated to accompany the rotation of only the first-stage cross-shaped holding section 5-1 provided on the uppermost stage. It is to be noted that the expansion operations in this case are carried out as follows. After the first-stage cross-shaped holding section 5-1 has been rotated by a rotation angle determined in advance, first of all, the rotation operation of the second-stage cross-shaped holding section 5-2 is started. Then, after the second-stage cross-shaped holding section 5-2 has been rotated by a rotation angle determined in advance to accompany the rotation of the first-stage cross-shaped holding section 5-1, the rotation operation of the third-stage cross-shaped holding section 5-3 is started.

In addition, the first-stage cross-shaped holding section 5-1 having the largest rotation quantity is provided with a pole 5-1P. The pole 5-1P is created to protrude toward the lower side of the illumination apparatus 1.

By providing the first-stage cross-shaped holding section 5-1 with the pole 5-1P, the second-stage cross-shaped holding section 5-2 and the third-stage cross-shaped holding section 5-3 can be sequentially folded in accordance with a rotation which is made by the rotation shaft 6 in a direction opposite to the expansion-time direction when the LEDs are turned off, that is, in accordance with a rotation which is made by the first-stage cross-shaped holding section 5-1 in a direction opposite to the expansion-time direction when the LEDs are turned off. To put it concretely, when the first-stage cross-shaped holding section 5-1 is rotated in the opposite direction, the pole 5-1P sequentially latches the second-stage cross-shaped holding section 5-2 and the third-stage cross-shaped holding section 5-3 so that the second-stage cross-shaped holding section 5-2 and the third-stage cross-shaped holding section 5-3 can be rotated in tune with the first-stage cross-shaped holding section 5-1. As a result, when the first-stage cross-shaped holding section 5-1 is put back to the position in the initial state, the second-stage cross-shaped holding section 5-2 and the third-stage cross-shaped holding section 5-3 can also be put back to their respective positions in the initial state in the same way as the first-stage cross-shaped holding section 5-1.

By the way, inventors of the present technology carried out experiments to find out relations between the current for driving the LED created on the upward facing LED substrate 3 and the substrate temperature which is the temperature of heat dissipated by the upward facing LED substrate 3.

Figure 13:
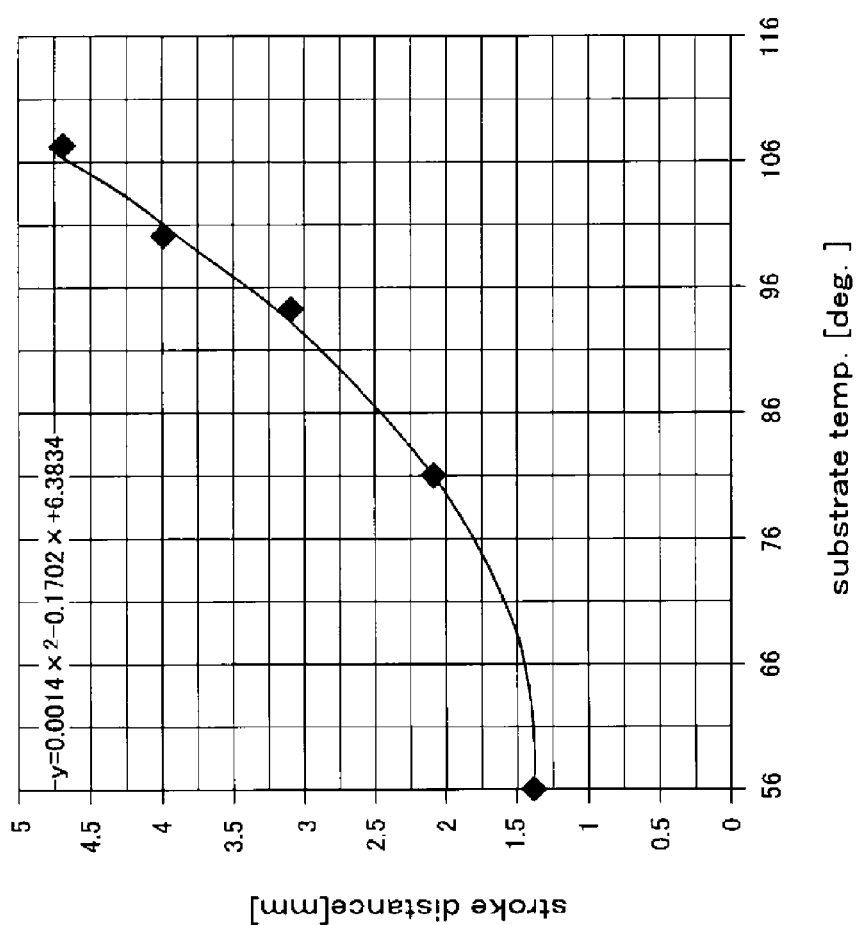
FIG. 13 is a diagram showing a relation between the substrate temperature and the driving force or the stroke distance.

The results of the experiments are given as follows.
260 mA→107 degrees Celsius
240 mA→100 degrees Celsius
220 mA→94 degrees Celsius
180 mA→81 degrees Celsius
100 mA→56 degrees Celsius In addition, the inventors of the present technology carried out experiments to find out a relation between the substrate temperature and the stroke distance which is the quantity of driving performed by the thermal actuator 12. The result of the experiments is shown in FIG. 13.

In the experiments, the inventors of the present technology measured the stroke distances for substrate temperatures of 107 degrees Celsius, 100 degrees Celsius, 94 degrees Celsius, 81 degrees Celsius and 56 degrees Celsius. The results of the measurements are given as follows.
107 degrees Celsius (260 mA)→4.7 mm
100 degrees Celsius (240 mA)→4.0 mm
94 degrees Celsius (220 mA)→3.1 mm
81 degrees Celsius (180 mA)→2.1 mm
56 degrees Celsius (100 mA)→1.4 mm By applying the fitting technique to the results, the relation between the x coordinate representing the substrate temperature and the y coordinate representing the stroke distance can be found out as a relation expressed by the following equation.

$$y=0.0014x^2-0.1702x+6.3834$$

It is to be noted that, as is obvious also from the results of the experiments, in accordance with the configuration of the illumination apparatus 1 according to the embodiment, by controlling the amount of light emitted by the LEDs provided on the upward facing LED substrate 3 serving as a substrate for indirect illumination, it is possible to control the expansion position of the downward facing LED substrate 4, that is, it is possible to control the rotation angle of the cross-shaped holding section 5.

3: Circuit Configuration

The illumination apparatus 1 according to the embodiment has a function to gradually turn on the downward facing LEDs created on the cross-shaped holding sections 5 in accordance with the rotation states of the first-stage cross-shaped holding section 5-1, the second-stage cross-shaped holding section 5-2 and the third-stage cross-shaped holding section 5-3 which are sequentially making transitions from the initial state in the following order: the first-stage cross-shaped holding section 5-1→the second-stage cross-shaped holding section 5-2→the third-stage cross-shaped holding section 5-3.

To put it concretely, the illumination apparatus 1 sequentially turns on the downward facing LEDs created on the cross-shaped holding sections 5 in the order in which the cross-shaped holding sections 5 are making transitions from the initial state.

It is to be noted that, for confirmation, the downward facing LEDs are LEDs created on the downward facing LED substrate 4.

Figure 14:
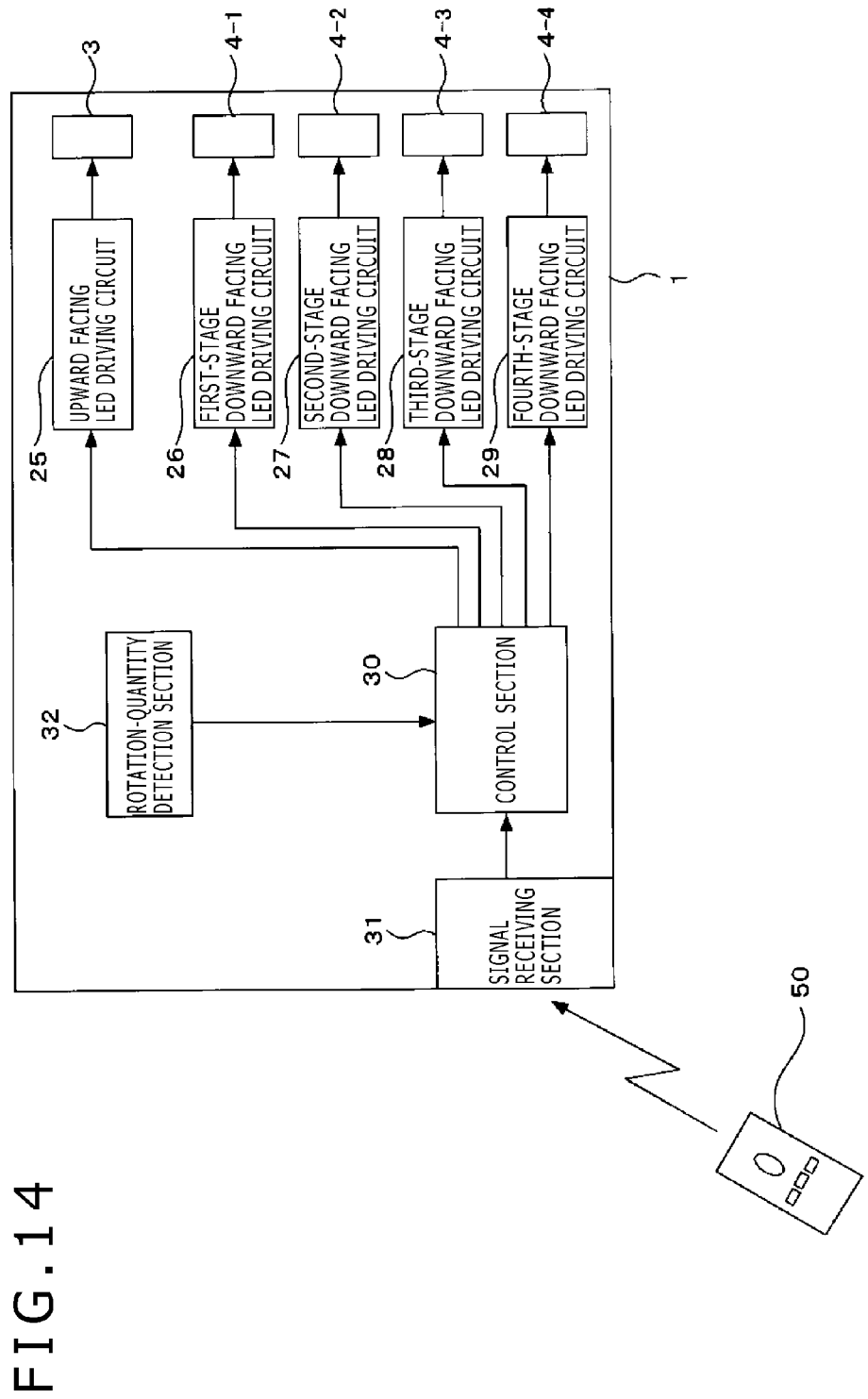
FIG. 14 is a block diagram showing the internal configuration of the illumination apparatus according to the embodiment.

FIG. 14 is a block diagram showing the internal configuration of the illumination apparatus 1 having the function to sequentially turn on the downward facing LEDs in accordance with the embodiment as described above.

It is to be noted that, in addition to the internal configuration of the illumination apparatus 1, FIG. 14 also shows a remote controller 50 utilized by the user to remotely operate the illumination apparatus 1.

As shown in the figure, the illumination apparatus 1 is provided with an upward facing LED driving circuit 25, a first-stage downward facing LED driving circuit 26, a second-stage downward facing LED driving circuit 27, a third-stage downward facing LED driving circuit 28, a fourth-stage downward facing LED driving circuit 29, a control section 30, a signal receiving section 31 and a rotation-quantity detection section 32. The upward facing LED driving circuit 25 is connected to the upward facing LED substrate 3 and drives the upward facing LEDs created on the upward facing LED substrate 3 to emit light.

The first-stage downward facing LED driving circuit 26 is a circuit which is connected to the downward facing LED substrate 4-1 provided on the first-stage cross-shaped holding section 5-1 and is used for driving the downward facing LEDs created on the downward facing LED substrate 4-1 to emit light.

By the same token, the second-stage downward facing LED driving circuit 27 is a circuit which is connected to the downward facing LED substrate 4-2 provided on the second-stage cross-shaped holding section 5-2 and is used for driving the downward facing LEDs created on the downward facing LED substrate 4-2 to emit light.

In the same way, the third-stage downward facing LED driving circuit 28 is a circuit which is connected to the downward facing LED substrate 4-3 provided on the third-stage cross-shaped holding section 5-3 and is used for driving the downward facing LEDs created on the downward facing LED substrate 4-3 to emit light.

Likewise, the fourth-stage downward facing LED driving circuit 29 is a circuit which is connected to the downward facing LED substrate 4-4 provided on the fourth-stage cross-shaped holding section 5-4 and is used for driving the downward facing LEDs created on the downward facing LED substrate 4-4 to emit light.

The control section 30 is configured as typically a microcomputer for controlling the entire illumination apparatus 1.

The control section 30 gives commands to the upward facing LED driving circuit 25, the first-stage downward facing LED driving circuit 26, the second-stage downward facing LED driving circuit 27, the third-stage downward facing LED driving circuit 28 and the fourth-stage downward facing LED driving circuit 29 on the basis of operation control signals received by the signal receiving section 31 from the remote controller 50 and information detected by the rotation-quantity detection section 32 as information on the quantity of a rotation made by the rotation shaft 6. The control section 30 issues commands to the upward facing LED driving circuit 25 in order to control light emission of upward facing LEDs each serving as an indirect illumination LED. In addition, the control section 30 also issues commands to the first-stage downward facing LED driving circuit 26, the second-stage downward facing LED driving circuit 27, the third-stage downward facing LED driving circuit 28 and the fourth-stage downward facing LED driving circuit 29 in order to control emission of light from the downward facing LEDs each serving as a direct illumination LED.

In this case, there are two concrete techniques for sequentially turning on LEDs.

First of all, the first technique is a technique provided for a case described as follows. If a command to turn on or off all LEDs is the only input command allowed to be issued to the illumination apparatus 1, in accordance with the command to turn on all LEDs, the heat-dissipation temperature of the upward facing LED substrate 3 increases relatively fast till a maximum temperature and, while this heat-dissipation temperature is increasing, the expansion operation of the downward facing LED substrate 4 is carried out at a comparatively high speed. To put it concretely, if the expansion operation of the downward facing LED substrate 4 is carried out at a comparatively high speed in accordance with the operation to turn on all upward facing LEDs in this way, on the basis of results of detecting the quantity of a rotation made by the rotation shaft 6, the downward facing LEDs are sequentially turned on in an order starting with the cross-shaped holding section 5 already making a transition from the initial state.

In order to implement the sequential LED turning-on operation in accordance with the first technique, the control section 30 carries out control as follows.

First of all, in accordance with the first technique, only a command to turn on or off all LEDs can be issued as an operation input command by the user to the illumination apparatus 1 by operating the remote controller 50.

In accordance with a command to turn on all LEDs, the control section 30 gives a command to the upward facing LED driving circuit 25 in order to turn on all upward facing LEDs each serving as an indirect-illumination LED. In addition, at the same time, also in accordance with the command to turn on all LEDs, the control section 30 gives a command to the fourth-stage downward facing LED driving circuit 29 in order to turn on all downward facing LEDs each serving as a direct-illumination LED created on the fourth-stage cross-shaped holding section 5-4 which is a fixed cross-shaped holding section included in the cross-shaped holding section 5.

Then, also in accordance with the command to turn on all LEDs, the control section 30 starts monitoring a rotation quantity detected by the rotation-quantity detection section 32.

Let the rotation quantity detected by the rotation-quantity detection section 32 as the rotation quantity for the initial state be 0. In this case, when the rotation quantity detected by the rotation-quantity detection section 32 is greater than 0, the control section 30 issues a command to the first-stage downward facing LED driving circuit 26 to, first of all, turn on the downward facing LEDs created on the first-stage cross-shaped holding section 5-1 provided on the uppermost stage.

Then, as the rotation quantity detected by the upward facing LED substrate 3-2 becomes greater than a first threshold value larger than 0, the control section 30 issues a command to the second-stage downward facing LED driving circuit 27 to turn on the downward facing LEDs created on the second-stage cross-shaped holding section 5-2.

Subsequently, as the rotation quantity detected by the rotation-quantity detection section 32 becomes greater than a second threshold value larger than the first threshold value, the control section 30 issues a command to the third-stage downward facing LED driving circuit 28 to turn on the downward facing LEDs created on the third-stage cross-shaped holding section 5-3.

In this way, the operations to sequentially turn on LEDs are carried out in accordance with the first technique.

It is to be noted that, in this case, in accordance with commands to turn off LEDs, the downward facing LEDs on the cross-shaped holding section 5 are gradually turned off as follows.

To put it concretely, when a command to turn off LEDs is received, the control section 30 issues a command to the upward facing LED driving circuit 25 to turn off the upward facing LEDs. In addition, at the same time, the control section 30 issues a command to the first-stage downward facing LED driving circuit 26 to turn off the downward facing LEDs created on the first-stage cross-shaped holding section 5-1 provided on the uppermost stage. It is to be noted that, at that time, when the upward facing LEDs are turned off, the temperature of the upward facing LED substrate 3 gradually decreases and the rotation shaft 6 starts a rotation in a direction opposite to the direction adopted in the expansion time.

In addition, in accordance with a command to turn off LEDs, the control section 30 monitors the rotation quantity detected by the rotation-quantity detection section 32. When the rotation quantity becomes smaller than the second threshold value, the control section 30 issues a command to the second-stage downward facing LED driving circuit 27 to turn off the downward facing LEDs created on the second-stage cross-shaped holding section 5-2. Then, as the rotation quantity becomes smaller than the first threshold value, the control section 30 issues a command to the third-stage downward facing LED driving circuit 28 to turn off the downward facing LEDs created on the third-stage cross-shaped holding section 5-3.

Furthermore, when the rotation quantity becomes equal to 0, the control section 30 issues a command to the fourth-stage downward facing LED driving circuit 29 to turn off the downward facing LEDs created on the fourth-stage cross-shaped holding section 5-4 fixed on the lowermost stage.

By carrying out the control to turn off the LEDs as described above, operations to turn off the downward facing LEDs are carried out sequentially starting with the downward facing LEDs created on the cross-shaped holding section 5 folded sequentially in a process to return to the initial state.

The second technique for sequentially turning on LEDs is a technique provided for a case in which a multi-step light modulation command can be issued. In other words, the second technique is provided for a case in which, when the amount of light emitted by an upward facing LED is set in a step-by-step manner by modulated light, the expansion operation of a downward facing LED is also carried out in a step-by-step manner.

To put it concretely, control is carried out to turn on the downward facing LEDs created on the cross-shaped holding section 5 sequentially making a transition from the initial state for each step of the modulated light.

In this case, for confirmation, the gradually modulated light emitted by the upward facing LED controls the amount of heat, which is transferred to the thermal actuator 12, in a step-by-step manner. Thus, the quantity of a rotation made by the rotation shaft 6 can be controlled in a step-by-step manner. That is to say, from this point, the steps of the modulated light can be associated with their respective states which are first, second and third states. The first state is a state in which only the first-stage cross-shaped holding section 5-1 has been expanded whereas the second state is a state in which the first-stage cross-shaped holding section 5-1 and the second-stage cross-shaped holding section 5-2 have been expanded. On the other hand, the third state is a state in which the first-stage cross-shaped holding section 5-1, the second-stage cross-shaped holding section 5-2 and the third-stage cross-shaped holding section 5-3 have all been expanded.

As described above, in accordance with the second technique, the downward facing LEDs created on the cross-shaped holding section 5 sequentially making a transition from the initial state are turned on for each of the expanded states which are the first, second and third states implemented to accompany modulated light from the upward facing LEDs.

With the second technique implemented, the control section 30 carries out the following control.

First of all, in this case, the remote controller 50 is allowed to issue commands of four stages as commands to modulate light. The commands of four stages include a command to turn off LEDs. In addition to the command to turn off LEDs, the commands of four stages also include commands of a first modulated-light state, a second modulated-light state and a third modulated-light state.

In accordance with the command of the first modulated-light state, the control section 30 issues a command to the upward facing LED driving circuit 25 to request the upward facing LED driving circuit 25 to drive the upward facing LEDs to emit light having an amount equal to a first emitted-light quantity determined in advance.

The light emitted by the upward facing LEDs as light having an amount equal to the first emitted-light quantity results in the first state in which only the first-stage cross-shaped holding section 5-1 has been expanded as described above. Thus, in accordance with a command for the first modulated-light state, the control section 30 carries out the control described above and control of giving a command to the first-stage downward facing LED driving circuit 26 to turn on the downward facing LEDs created on the first-stage cross-shaped holding section 5-1.

Accordingly, it is possible to turn on the downward facing LEDs created on the first-stage cross-shaped holding section 5-1 starting to operate for this first state.

It is to be noted that, in this first modulated-light state, it is also possible to turn on the downward facing LEDs created on the fourth-stage cross-shaped holding section 5-4 fixed on the lowermost stage. That is to say, in this first modulated-light state, control is carried out to result in a state to turn on downward facing LEDs which are the downward facing LEDs created on the first-stage cross-shaped holding section 5-1 and the downward facing LEDs created on the fourth-stage cross-shaped holding section 5-4.

In accordance with the command of the second modulated-light state, the control section 30 issues a command to the upward facing LED driving circuit 25 to request the upward facing LED driving circuit 25 to drive the upward facing LEDs to emit light having an amount equal to a second emitted-light quantity determined in advance. The second emitted-light quantity is larger than the first emitted-light quantity.

The light emitted by the upward facing LEDs as light having an amount equal to the second emitted-light quantity results in the second state in which the second-stage cross-shaped holding section 5-2 has been also expanded in addition to the first-stage cross-shaped holding section 5-1 as described above. That is to say, the second state is a stage in which the first-stage cross-shaped holding section 5-1 and the second-stage cross-shaped holding section 5-2 have been expanded. Thus, the control section 30 issues a command to emit light having an amount equal to the second emitted-light quantity and gives a command to the second-stage downward facing LED driving circuit 27 to turn on the downward facing LEDs created on the second-stage cross-shaped holding section 5-2.

Accordingly, it is possible to turn on the downward facing LEDs created on the second-stage cross-shaped holding section 5-2 starting to operate for this second state.

It is to be noted that, in this second modulated-light state, it is also possible to turn on the downward facing LEDs created on the fourth-stage cross-shaped holding section 5-4 fixed on the lowermost stage. That is to say, in this second modulated-light state, control is carried out to result in a state to turn on downward facing LEDs which are the downward facing LEDs created on the first-stage cross-shaped holding section 5-1, the downward facing LEDs created on the second-stage cross-shaped holding section 5-2 and the downward facing LEDs created on the fourth-stage cross-shaped holding section 5-4. Thus, in accordance with the command of the second modulated-light state, in addition to the control described above, control is also carried out to result in a state in which the downward facing LEDs created on the fourth-stage cross-shaped holding section 5-4 and the downward facing LEDs created on the first-stage cross-shaped holding section 5-1 are turned on.

In accordance with the command of the third modulated-light state, the control section 30 issues a command to the upward facing LED driving circuit 25 to request the upward facing LED driving circuit 25 to drive the upward facing LEDs to emit light having an amount equal to a third emitted-light quantity determined in advance. The third emitted-light quantity is larger than the second emitted-light quantity.

The light emitted by the upward facing LEDs as light having an amount equal to the third emitted-light quantity results in the third state in which the third-stage cross-shaped holding section 5-3 has been also expanded in addition to the first-stage cross-shaped holding section 5-1 and the second-stage cross-shaped holding section 5-2 as described above. That is to say, the third state is a stage in which the first-stage cross-shaped holding section 5-1, the second-stage cross-shaped holding section 5-2 and the third-stage cross-shaped holding section 5-3 have been all expanded. Thus, the control section 30 issues a command to emit light having an amount equal to the third emitted-light quantity and gives a command to the third-stage downward facing LED driving circuit 28 to turn on the downward facing LEDs created on the third-stage cross-shaped holding section 5-3.

Accordingly, it is possible to turn on the downward facing LEDs created on the third-stage cross-shaped holding section 5-3 starting to operate for this third state.

It is to be noted that, in this third modulated-light state, it is also possible to turn on the downward facing LEDs created on the fourth-stage cross-shaped holding section 5-4 fixed on the lowermost stage. That is to say, in this third modulated-light state, control is carried out to result in a state to turn on downward facing LEDs which are the downward facing LEDs created on the first-stage cross-shaped holding section 5-1, the downward facing LEDs created on the second-stage cross-shaped holding section

5-2, the downward facing LEDs created on the third-stage cross-shaped holding section 5-3 and the downward facing LEDs created on the fourth-stage cross-shaped holding section 5-4. Thus, in accordance with the command of the third modulated-light state, in addition to the control described above, control is also carried out to result in a state in which the downward facing LEDs created on the fourth-stage cross-shaped holding section 5-4, the downward facing LEDs created on the first-stage cross-shaped holding section 5-1 and the downward facing LEDs created on the second-stage cross-shaped holding section 5-2 are turned on.

In addition, in this case, in accordance with the command to turn off LEDs, the control section 30 carries out control to turn off all LEDs. That is to say, the control section 30 gives commands to turn off LEDs to the upward facing LED driving circuit 25, the first-stage downward facing LED driving circuit 26, the second-stage downward facing LED driving circuit 27, the third-stage downward facing LED driving circuit 28 and the fourth-stage downward facing LED driving circuit 29 in order to turn off the LEDs.

It is to be noted that, as is obvious from the above descriptions, if the second technique is adopted, the quantity of a rotation made by the rotation shaft 6 does not have to be detected. Thus, the rotation-quantity detection section 32 can be eliminated.

Even if the second technique is adopted, however, it is possible to carry out control to turn on or off the downward facing LEDs on the basis of the result of detection of the rotation quantity.

In particular, in order to turn off the downward facing LEDs, assume that control is to be carried out to sequentially turn off the downward facing LEDs created on the cross-shaped holding section 5 folded sequentially in the same way as the first technique. In this case, the control is executed to turn off the downward facing LEDs on the basis of the result of the rotation-quantity detection carried out by the rotation-quantity detection section 32 in the same way as the first technique.

4: Conclusion

As explained above, the embodiment of the present technology implements the illumination apparatus 1 having a movable section moved to change the light radiation position, the light radiation direction and the like. In the illumination apparatus 1, the movable section such as the rotation shaft 6 and the cross-shaped holding section 5 is moved by making use of heat dissipated by the upward facing LED substrate 3 serving as a light emitting section.

In accordance with the embodiment, unlike the existing illumination apparatus, it is no longer necessary to separately provide a force generation section such as a motor and it is thus possible to effectively prevent the power consumption from rising. At the same time, it is also unnecessary to add electric wires, a driving circuit substrate and the like. Accordingly, the number of separately added components can be prevented from increasing so that a cost increase can be suppressed.

In addition, in accordance with the embodiment, the user is not required to spend time and make efforts to manually drive the movable section.

On top of that, in the embodiment, the upward facing LED substrate 3 dissipating heat is provided at a location close to the center axis of the illumination apparatus 1. Thus, the movable section such as the rotation shaft 6 can be provided at the center of the illumination apparatus 1 and the movable section can be covered by a case. That is to say, the movable section is not visible in the external appearance so that it is possible to prevent the external appearance from losing its aesthetic design.

In addition, in accordance with the embodiment, when the rotation shaft 6 rotates, the movable cross-shaped holding section 5 and the movable downward facing LED substrate 4 are expanded gradually so that downward facing LEDs are sequentially turned on. Thus, it is possible to further increase the illumination performance effect.

5: Typical Modifications

A concrete embodiment of the present technology has been explained so far. However, implementations of the present technology are by no means limited to the embodiment.

Figure 15:
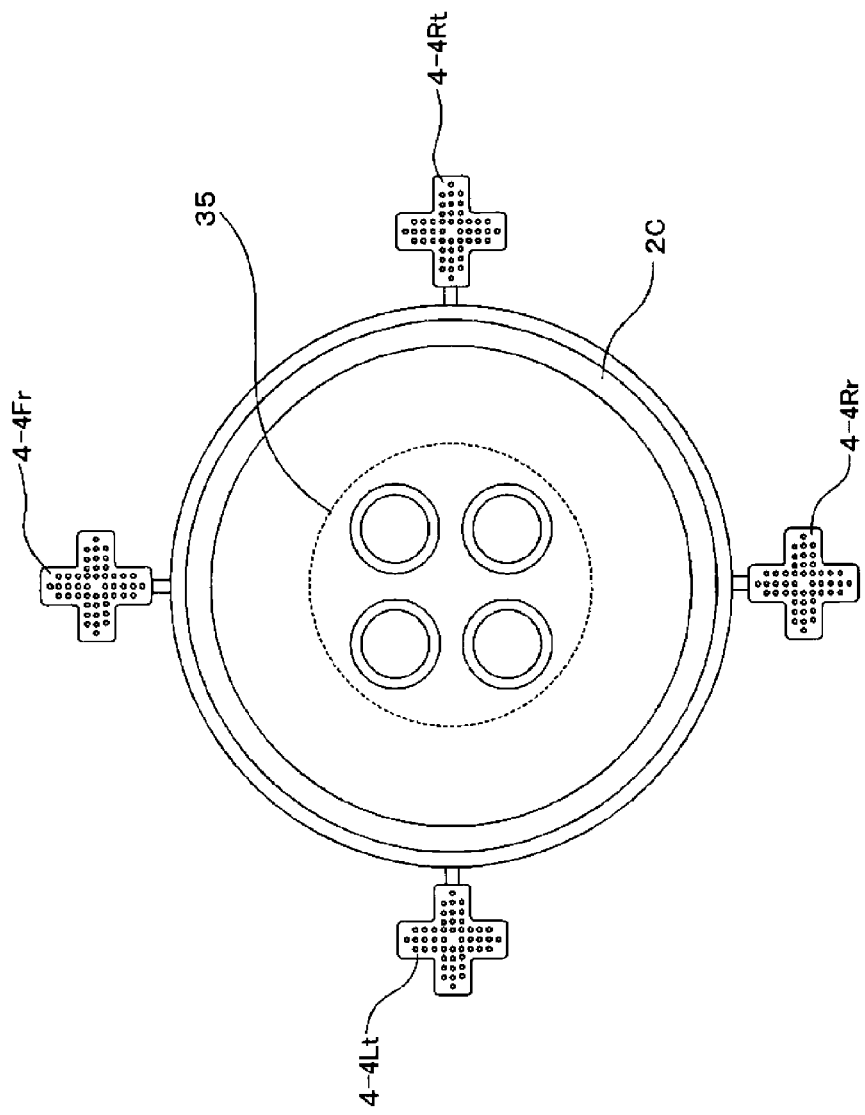
FIG. 15 is an explanatory diagram showing a connection section created in the illumination apparatus.

For example, in accordance with the configuration of the illumination apparatus 1 according to the embodiment, the light source for direct illumination is provided on an external edge of the illumination apparatus 1 instead of being provided at the center of the illumination apparatus 1. Thus, unlike the existing illumination apparatus, it is no longer necessary to provide a section for mounting and dismounting a lamp at the center. Since it is no longer necessary to provide a section for mounting and dismounting a lamp at the center, it is possible to provide a connection section 35 at the center on the lower side of the illumination apparatus as shown for example in FIG. 15. The connection section 35 is a section for connecting a device for enhancing a function other than the illumination function.

Typical examples of the device connected to the connection section 35 and used for enhancing a function other than the illumination function are an acoustic-sound generation apparatus, an image taking apparatus and a sound receiving apparatus.

It is to be noted that the illumination apparatus 1 according to the embodiment has a configuration in which the LEDs (or the LED substrate) cannot be mounted and dismounted. By the way, this configuration is a result of consideration of the fact that the LEDs have a long life in comparison with, among others, a filament lamp and a fluorescent lamp which are used in an existing illumination apparatus. In other words, by making use of LEDs as a light source, unlike the existing illumination apparatus, it is no longer necessary to provide a section for mounting and dismounting a lamp at a location close to the center. Accordingly, the position of the light source can be selected with a higher degree of freedom.

In addition, as explained so far, the number of upward facing LED substrates 3 on which upward facing LEDs are created to serve as indirect-illumination LEDs is eight. On the other hand, the number of downward facing LED substrates 4 on which downward facing LEDs are created to serve as direct-illumination LEDs is 16. However, the number of such upward facing LED substrates 3 and the number of such downward facing LED substrates 4 are no more than typical. That is to say, the number of such upward facing LED substrates 3 does not have to be eight whereas the number of such downward facing LED substrates 4 does not have to be 16.

In addition, the shape of each LED substrate is by no means limited to the cross shape. That is to say, the shape of each LED substrate can of course be a shape other than the cross shape.

On top of that, as explained so far, as a technique for setting the rotation angle of each of the cross-shaped holding sections 5 in the expanded state, a typical technique of making use of wires W1 and W2 for connecting the cross-shaped holding sections 5 to each other is adopted. However, in place of this typical technique, another technique of providing force transferring gears and making the gear ratios of the force transferring gears different from cross-shaped holding section 5 to cross-shaped holding section 5. By adoption of this other technique, it is also possible to set the rotation angle of each of the cross-shaped holding sections 5 in the expanded state. The force transferring gear set for a cross-shaped holding section 5 is a gear for transferring a driving force from the rotation shaft 6 to the cross-shaped holding section 5 which is made movable.

It is to be noted that, in this case, when the thermal actuator 12 generates a driving force, the cross-shaped holding sections 5 made movable start moving simultaneously at the same time at their respective velocities which are different from each other.

In addition, the expansion operation of the light source is by no means limited to the operation based on the explained rotation.

Typical modifications of the expansion operation are explained by referring to FIG. 16 as follows.

Figure 16A:
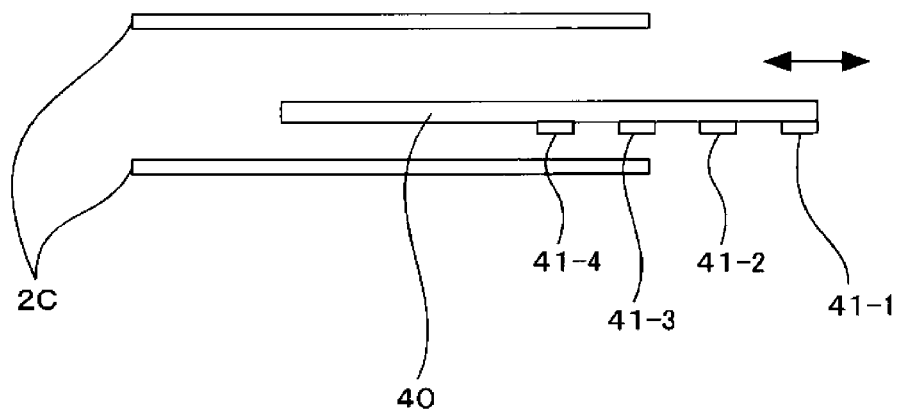
FIGS. 16A and 16B are explanatory diagrams each showing a typical modification of an expansion operation.

FIG. 16A is an explanatory diagram referred to in the following description of an expansion operation serving as a first typical modification. In the first typical modification, for example, a substrate support section 40 having a cylindrical shape is provided. A plurality of LED substrates 41 are provided on the substrate support section 40. In the case of the first typical modification shown in the figure, four LED substrates 41 are provided. The four LED substrates 41 are an LED substrate 41-1, an LED substrate 41-2, an LED substrate 41-3 and an LED substrate 41-4.

Such a substrate support section 40 is sled in the horizontal direction as shown in the figure by making use of a driving force generated by an actuator which operates by utilizing heat dissipated by the light source in the same way as the thermal actuator 12. The actuator itself is not shown in the figure.

By adoption of such a technique, it is also possible to implement the expansion operations of the light source (and the LED substrate 41).

It is to be noted that, in order to prevent FIG. 16A from becoming complicated, only one substrate support section 40 is shown. However, a plurality of substrate support sections 40 can of course be provided and sled.

In the case of a configuration in which a plurality of substrate support sections 40 are provided, for example, the substrate support sections 40 are conceivably sled in a sliding direction such as a radiation-shaped direction.

Figure 16B:
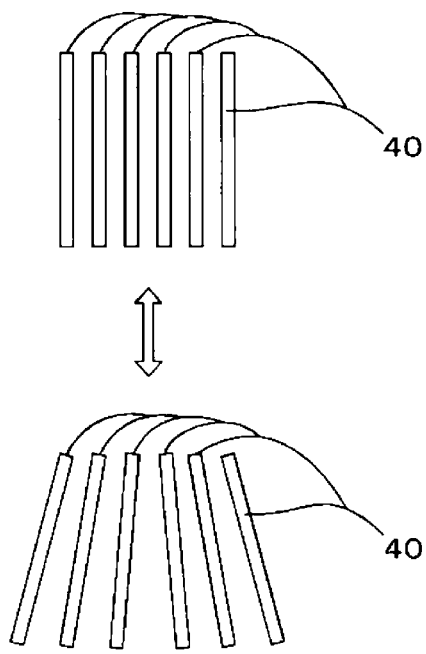

On the other hand, FIG. 16B is an explanatory diagram referred to in the following description of an expansion operation serving as a second typical modification.

In the case of the second typical modification, as shown in the upper diagram of FIG. 16B, a plurality of substrate support sections 40 are laid out and oriented in such a way that the longitudinal direction of the substrate support sections 40 matches the vertical direction. In this case, the substrate support sections 40 are moved to spread into the shape of an umbrella as shown in the lower diagram of FIG. 16B by making use of a driving force generated by a thermal actuator operating by utilizing heat dissipated by the light source.

By adoption of such a technique, it is also possible to implement the expansion operations of the light source (and the LED substrate 41).

In addition, as explained so far, as an example, the thermal actuator 12 is made of a shape-memory alloy. However, the thermal actuator does not have to be made of a shape-memory alloy. For example, the thermal actuator can also be made of a shape-memory ceramic material, a shape-memory polymer or a bimetal.

As an alternative, the inside of the cylinder can also be filled up with liquid having expansion and contraction properties attributed to thermal sensitivity to heat. A typical example of such liquid is liquid having a low boiling point. In this case, the thermal actuator generates a driving force on the basis of the expansion and contraction properties of the liquid.

On top of that, as explained so far, the control to turn on and off LEDs is carried out in accordance with an operation carried out by the user on the remote controller 50. However, it is also possible to provide a typical configuration in which an infrared sensor or the like is provided and used to detect the presence/absence of the user and the control to turn on and off LEDs is carried out in accordance with the result of the detection.

In addition, in accordance with the second technique described before, the steps of the modulated light are associated with the expansion states serving as the first to third states. As indicated by the experiment results shown in FIG. 13 explained earlier, however, the relation between the substrate temperature of the light source and the stroke distance of the actuator is nonlinear. That is to say, the stroke distance rises exponentially with increases in substrate temperature. In the relation, the substrate temperature can be interpreted as the driving current. In order to associate the steps of the modulated light with the expansion states as described above, the step of the modulated light is incremented as follows: 1→2→3 and, each time the step of the modulated light is incremented, the difference in emitted-light amount must be undesirably decreased in a gradual manner. This is because the rotation quantities of the rotation shaft 6 in transitions of the first state→the second state→the third state are approximately equal to each other.

Thus, a countermeasure may be taken. As a typical example of the countermeasure, a separate configuration is provided to allow the rotation shaft 6 to be rotated by a fixed angle of rotation for every modulated-light step even if the difference in emitted-light amount is constant for every modulated-light step. That is to say, the separate configuration allows the steps of the modulated light to be associated with the expansion states even if the linearity of the modulated state is assured.

For example, a conceivable countermeasure is typically taken by providing a separate configuration in which the pressure applied to the rotation shaft 6 is raised in accordance with an increase of the temperature of the upward facing LED substrate 3. As an alternative, a configuration is provided to allow a driving force generated by the thermal actuator 12 to be applied to the rotation shaft 6 through a transmission gear. In addition, in this configuration, the gear ratio of the transmission gear is changed in accordance with the temperature of the upward facing LED substrate 3 so that, as the temperature of the upward facing LED substrate 3 increases, the quantity of a rotation made by the rotation shaft 6 gradually decreases.

In addition, the present technology can be realized into implementations described as follows.

1: An illumination apparatus including:
  a first light emitting section;
  a thermal actuator configured to generate a driving force on the basis of heat dissipated by the first light emitting section; and a displacement mechanism configured to displace a predetermined object by making use of the driving force generated by the thermal actuator.

2: The illumination apparatus according to implementation 1 wherein a light source employed in the first light emitting section is an LED (Light Emitting Diode).

3: The illumination apparatus according to implementation 1 or 2 wherein the thermal actuator has a shape-memory alloy and generates the driving force by making use of a change caused by the heat as a change of the shape of the shape-memory alloy.

4: The illumination apparatus according to any one of implementations 1 to 3, the illumination apparatus further including:
a second light emitting source;
wherein the displacement mechanism is configured to displace the second light emitting source used as the object.

5: The illumination apparatus according to implementation 4 wherein a light source employed in the second light emitting section is an LED.

6: The illumination apparatus according to implementation 4 or 5 wherein the first light emitting section and the second light emitting section are provided in such a way that the light emission directions of the first light emitting section and the second light emitting section are opposite to each other.

7: The illumination apparatus according to any one of implementations 1 to 6 wherein the displacement mechanism:
includes
a rotation shaft, and
a rotation-object holding section connected to the rotation shaft and used for holding the object; and
displaces the object by rotating the rotation shaft by making use of the driving force generated by the thermal actuator.

8: The illumination apparatus according to implementation 7 wherein the first light emitting section is provided in the neighborhood of the center axis of the rotation shaft.

9: The illumination apparatus according to any one of implementations 1 to 8 wherein the thermal actuator is configured to increase the driving force generated thereby as the amount of heat dissipated by the first light emitting section rises.

10: The illumination apparatus according to any one of implementations 7 to 9, the illumination apparatus having:
a plurality of second light emitting sections,
wherein the displacement mechanism is
configured to include a plurality of rotation-object holding sections each used for holding one of the second light emitting sections and configured to displace each of the second light emitting sections; and
further provided with a turn-on control section configured to carry out control to sequentially turn on the second light emitting sections in accordance with the quantity of a rotation made by the rotation shaft.

11: The illumination apparatus according to any one of implementations 1 to 6 or implementation 9 wherein the displacement mechanism is configured to drive a plurality of rod-shaped members in an opening or closing operation of forming the shape of an umbrella.

12: The illumination apparatus according to any one of implementations 1 to 6 or implementation 9 wherein the displacement mechanism is configured to displace the object by horizontally moving the rotation-object holding section for holding the object.

The present application contains subject matter related to that disclosed in Japanese Priority Patent Application JP 2011-256434 filed in the Japan Patent Office on Nov. 24, 2011, the entire content of which is hereby incorporated by reference.

What is claimed is:

1. An illumination apparatus comprising:
a first light emitting section;
a thermal actuator configured to generate a driving force based on heat dissipated by said first light emitting section; and
a displacement mechanism configured to displace at least one second light emitting section from a plurality of second light emitting sections by making use of said driving force generated based on said heat dissipated by said first light emitting section disposed opposite to said plurality of second light emitting sections,
wherein said displacement mechanism includes a plurality of rotation-object holding sections each used for holding one of said plurality of second light emitting sections, wherein an uppermost rotation-object holding section of said plurality of rotation-object holding sections is positioned closest to the first light emitting section, and remaining of said plurality of rotation-object holding sections are positioned below said uppermost rotation-object holding section, and on one another.

2. The illumination apparatus according to claim 1, wherein a light source employed in said first light emitting section is a light emitting diode.

3. The illumination apparatus according to claim 1, wherein said thermal actuator has a shape-memory alloy and generates said driving force by making use of a change caused by said heat as a change of the shape of said shape-memory alloy.

4. The illumination apparatus according to claim 1, wherein a light source employed in each of said plurality of second light emitting sections is a light emitting diode.

5. The illumination apparatus according to claim 1, wherein said first light emitting section and said plurality of second light emitting sections are configured such that light emission directions of said first light emitting section and said plurality of second light emitting sections are opposite to each other.

6. The illumination apparatus according to claim 1, wherein said displacement mechanism comprises:
a rotation shaft, and
said plurality of rotation-object holding sections connected to said rotation shaft and used for holding said plurality of second light emitting sections
wherein said plurality of second light emitting sections are displaced by rotating said rotation shaft by making use of said driving force generated by said thermal actuator.

7. The illumination apparatus according to claim 6, wherein said first light emitting section is provided in an area around the center axis of said rotation shaft.

8. The illumination apparatus according to claim 6, further comprising
a turn-on control section configured to carry out control to sequentially turn on said plurality of second light emitting sections in accordance with the quantity of a rotation made by said rotation shaft.

9. The illumination apparatus according to claim 8, wherein said turn-on control section is configured to turn on one light emitting section of said plurality of second light emitting sections, in an event the quantity of said rotation made by said rotation shaft is greater than a first threshold value.

10. The illumination apparatus according to claim 9, wherein said turn-on control section is configured to turn on another light emitting section of said plurality of second light emitting sections, in an event the quantity of said rotation made by said rotation shaft is greater than a second threshold value.

11. The illumination apparatus according to claim 1, wherein said thermal actuator is configured to increase said driving force corresponding to an increase in amount of heat dissipated by said first light emitting section.

12. The illumination apparatus according to claim 1, wherein said displacement mechanism is configured to drive a plurality of rod-shaped members in an opening or closing operation of forming the shape of an umbrella.

13. The illumination apparatus according to claim 1, wherein said displacement mechanism is configured to displace at least one second light emitting section from said plurality of second light emitting sections by horizontally moving one of said plurality of rotation-object holding sections.

14. The illumination apparatus according to claim 1, wherein said plurality of second light emitting sections are sequentially turned on in accordance with an order in which said plurality of rotation-object holding sections make transitions from an initial state.

15. A driving apparatus comprising:
a first light emitting section;
a thermal actuator configured to generate a driving force based on heat dissipated by said first light emitting section, wherein at least one second light emitting section from a plurality of second light emitting sections is displaced based on said driving force generated by said thermal actuator,
wherein said displacement mechanism includes a plurality of rotation-object holding sections each used for holding one of said plurality of second light emitting sections, wherein an uppermost rotation-object holding section of said plurality of rotation-object holding sections is positioned closest to the first light emitting section, and remaining of said plurality of rotation-object holding sections are positioned below said uppermost rotation-object holding section, and on one another; and
a rotation shaft configured to displace said at least one second light emitting section, wherein said at least one second light emitting section of said plurality of second light emitting sections is turned on based on an amount of rotation made by said rotation shaft exceeding a predetermined threshold value.

16. A driving method comprising:
displacing, by a displacement mechanism, at least one light emitting section from a plurality of light emitting sections by making use of a driving force generated by a thermal actuator configured to generate said driving force based on heat dissipated by another light emitting section disposed opposite to said light emitting section,
wherein said displacement mechanism includes a plurality of rotation-object holding sections each used for holding one of said plurality of light emitting sections, wherein an uppermost rotation-object holding section of said plurality of rotation-object holding sections is positioned closest to the other light emitting section, and remaining of said plurality of rotation-object holding sections are positioned below said uppermost rotation-object holding section, and on one another.

* * * * *